Sept. 16, 1941.   R. J. WISE ET AL   2,255,868
SYSTEM AND APPARATUS FOR FACSIMILE TELEGRAPHY
Original Filed Nov. 13, 1936   11 Sheets-Sheet 1

INVENTORS
R. J. WISE
G. H. RIDINGS
BY F. L. O'BRIEN
F. E. d'HUMY
Eugene E. Brow
ATTORNEY Sept. 16, 1941.  R. J. WISE ET AL  2,255,868
SYSTEM AND APPARATUS FOR FACSIMILE TELEGRAPHY
Original Filed Nov. 13, 1936  11 Sheets-Sheet 3

INVENTORS
R. J. WISE
G. H. RIDINGS
F. L. O'BRIEN
F. E. d'HUMY
BY Eugene C. Brown
ATTORNEY Sept. 16, 1941.  R. J. WISE ET AL  2,255,868

SYSTEM AND APPARATUS FOR FACSIMILE TELEGRAPHY

Original Filed Nov. 13, 1936   11 Sheets—Sheet 4

INVENTORS
R. J. WISE
G. H. RIDINGS
F. L. O'BRIEN
F. E. d'HUMY
BY Eugene C. Brown
ATTORNEY Sept. 16, 1941.  R. J. WISE ET AL  2,255,868
SYSTEM AND APPARATUS FOR FACSIMILE TELEGRAPHY
Original Filed Nov. 13, 1936   11 Sheets-Sheet 5

INVENTORS
R. J. WISE
G. H. RIDINGS
F. L. O'BRIEN
F. E. d'HUMY
BY Eugene E. Brown
ATTORNEY

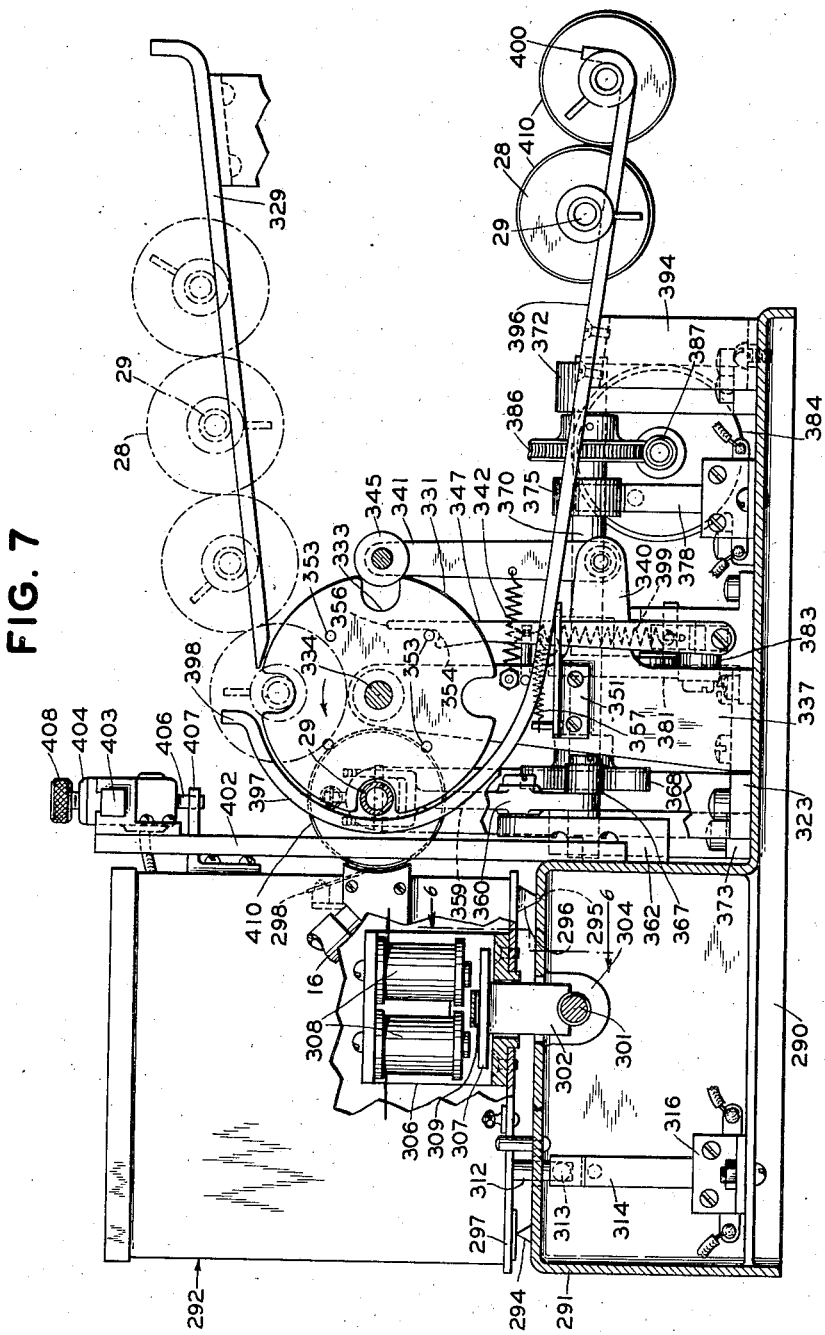

Sept. 16, 1941.   R. J. WISE ET AL   2,255,868
SYSTEM AND APPARATUS FOR FACSIMILE TELEGRAPHY
Original Filed Nov. 13, 1936   11 Sheets-Sheet 7

INVENTORS
R.J. WISE
G.H. RIDINGS
F.L. O'BRIEN
F.E. d'HUMY
BY Eugene C. Brown
ATTORNEY Sept. 16, 1941.   R. J. WISE ET AL   2,255,868
SYSTEM AND APPARATUS FOR FACSIMILE TELEGRAPHY
Original Filed Nov. 13, 1936   11 Sheets-Sheet 9

INVENTORS
R.J.WISE
G.H.RIDINGS
BY  F.L.O'BRIEN
F.E.d'HUMY
Eugene C. Brown
ATTORNEY

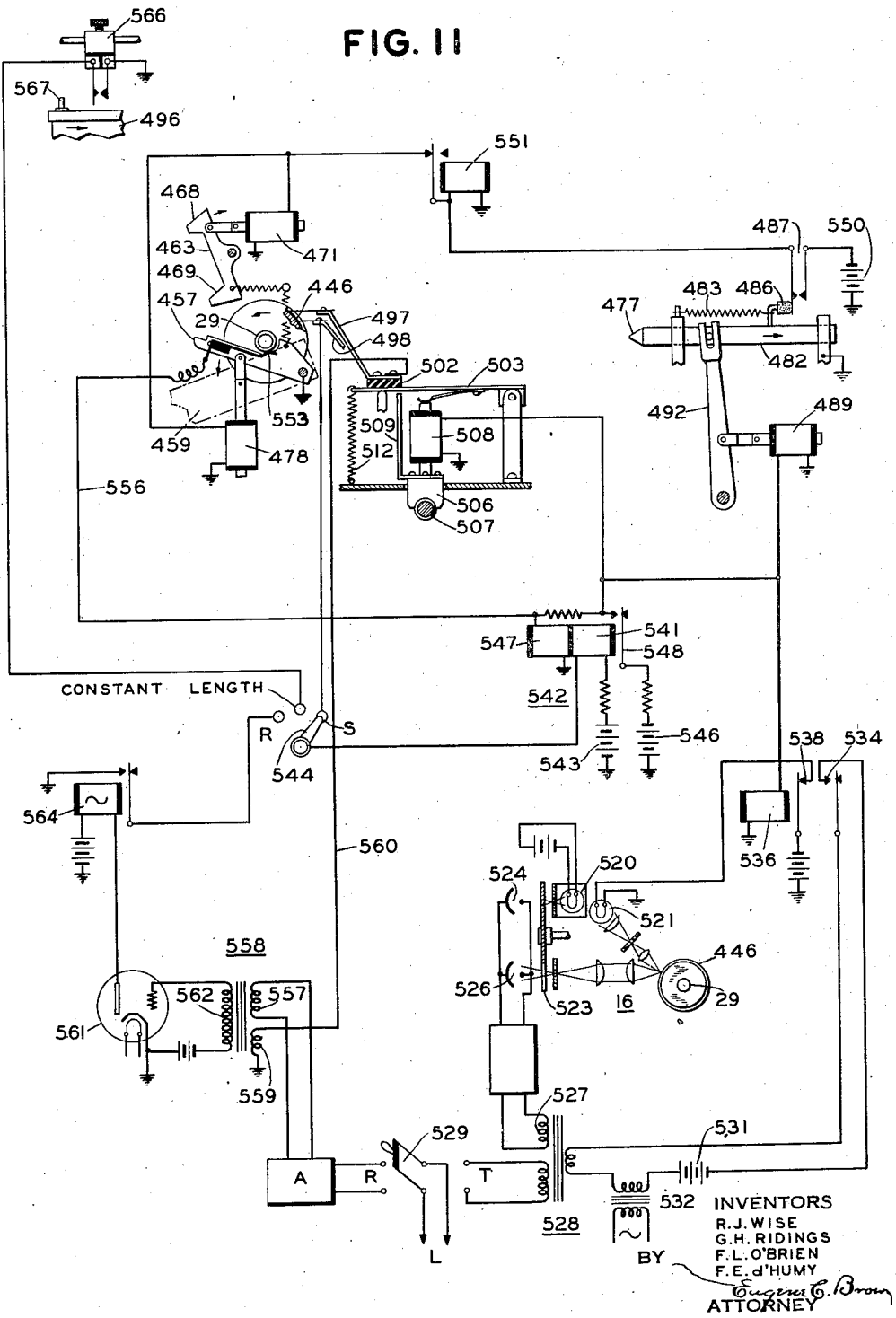

Sept. 16, 1941.  R. J. WISE ET AL  2,255,868
SYSTEM AND APPARATUS FOR FACSIMILE TELEGRAPHY
Original Filed Nov. 13, 1936   11 Sheets-Sheet 11

INVENTORS
R. J. WISE
G. H. RIDINGS
F. L. O'BRIEN
F. E. d'HUMY
BY  Eugene E. Brown
ATTORNEY Patented Sept. 16, 1941

2,255,868

UNITED STATES PATENT OFFICE 2,255,868

SYSTEM AND APPARATUS FOR FACSIMILE TELEGRAPHY

Raleigh J. Wise, Dunellen, Garvice H. Ridings, Summit, and Frederic L. O'Brien, Lyndhurst, N. J., and Fernand E. d'Humy, Scarsdale, N. Y., assignors to The Western Union Telegraph Company, New York, N. Y., a corporation of New York Application November 13, 1936, Serial No. 110,760
Renewed June 22, 1940

57 Claims. (Cl. 178—13)

The present invention relates to telegraphy and more particularly to an automatic system and apparatus for transmitting and receiving messages, pictures and other subject matter in facsimile.

The primary object of the present invention is to provide a facsimile telegraph system including one or more interconnected sending and receiving stations with means at each station to cause automatic transmission and reception of a message or a plurality of successive messages.

Another object of the present invention is to provide novel automatic apparatus capable of serving either as a facsimile transmitter or receiver.

In accordance with the present invention, pictures, messages or other subject matter are transmitted from or received upon a subject matter sheet carried by interchangeable copyholders which are automatically placed in operative position in the combined transmitter-recorder and removed therefrom. In the preferred form of the invention, picture or message sheets are carried by interchangeable cylinders. Accordingly, still another important object is to provide a facsimile transmitter and receiver having automatic means for supplying messages or pictures in succession for transmission, or message blanks in succession for reception.

A further object is to provide a novel remote control system for effecting control of apparatus at a distant point.

A still further object of the present invention is to provide a facsimile telegraph system embodying novel means for phase control of received copy.

A still further object of the present invention resides in the provision of novel means for retaining a flexible sheet on a platen.

A still further object of the present invention is to provide novel means for producing an end of transmission signal.

The foregoing and other objects of the invention will appear from the following description of an illustrative embodiment of the invention and modifications thereof.

In the drawings:

Fig. 7 is a view in sectional elevation of the apparatus of Fig. 6, the section being taken on line 7—7 and partly on line 7'—7' thereof;

Fig. 11 is a diagrammatic showing of the electrical features of a modified control system suitable for use with the apparatus of Fig. 9;

Certain features of the transmitter-receiver disclosed and claimed in the application of Raleigh J. Wise, Ser. No. 84,935, entitled "System and apparatus for facsimile telegraphy" and filed June 12, 1936, now Patent No. 2,158,391, are shown in the present application with detail parts omitted for the sake of clearness in combination with automatic copy changing means thereby providing a novel automatic transmitter-receiver.

Figure 1:
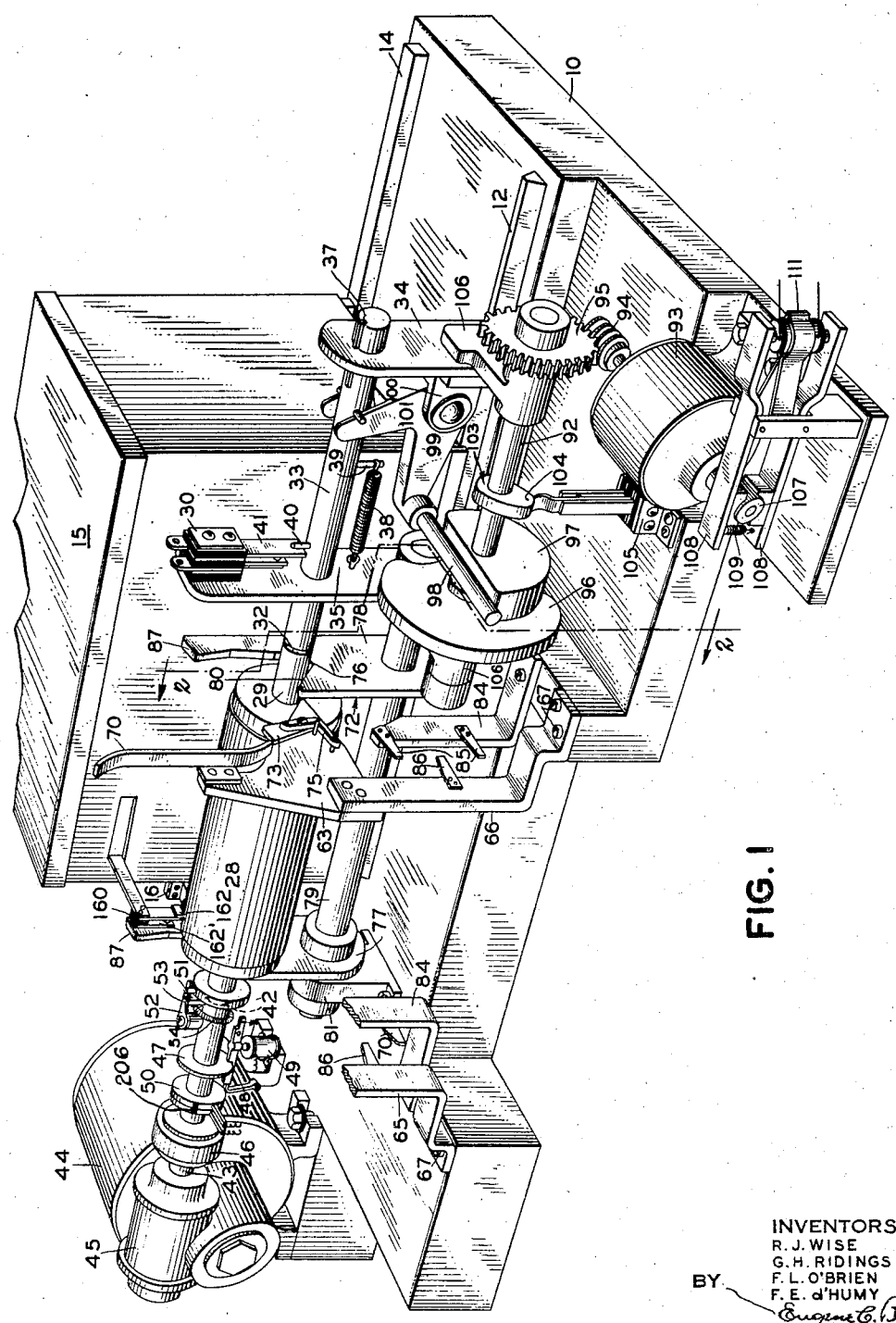
Fig. 1 is a perspective view of a facsimile transmitter or receiver embodying the invention in one of its preferred forms.
Figure 2:
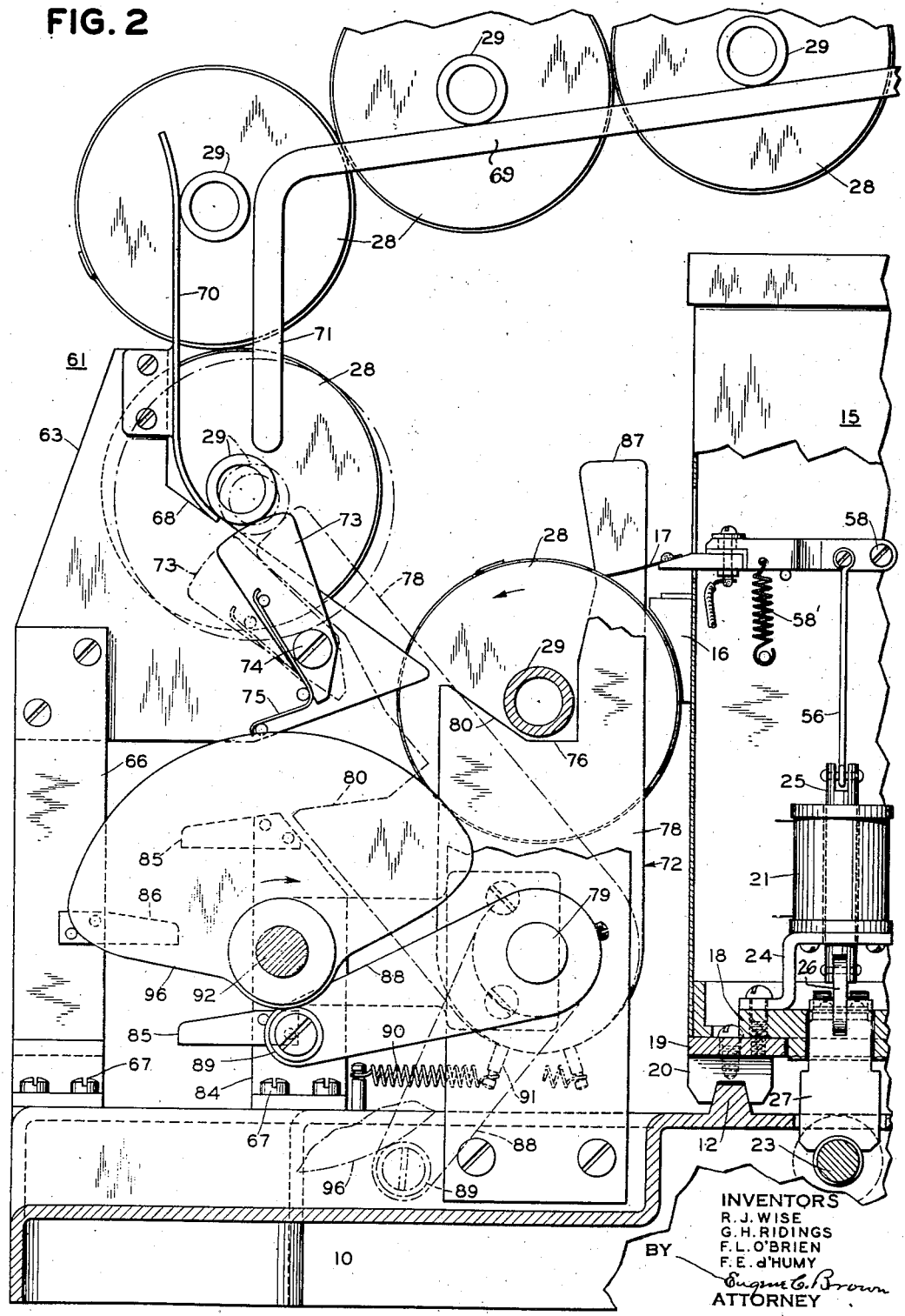
Fig. 2 is an enlarged fragmentary elevational view taken partly in section approximately on line 2—2 of Fig. 1.
Figure 3:
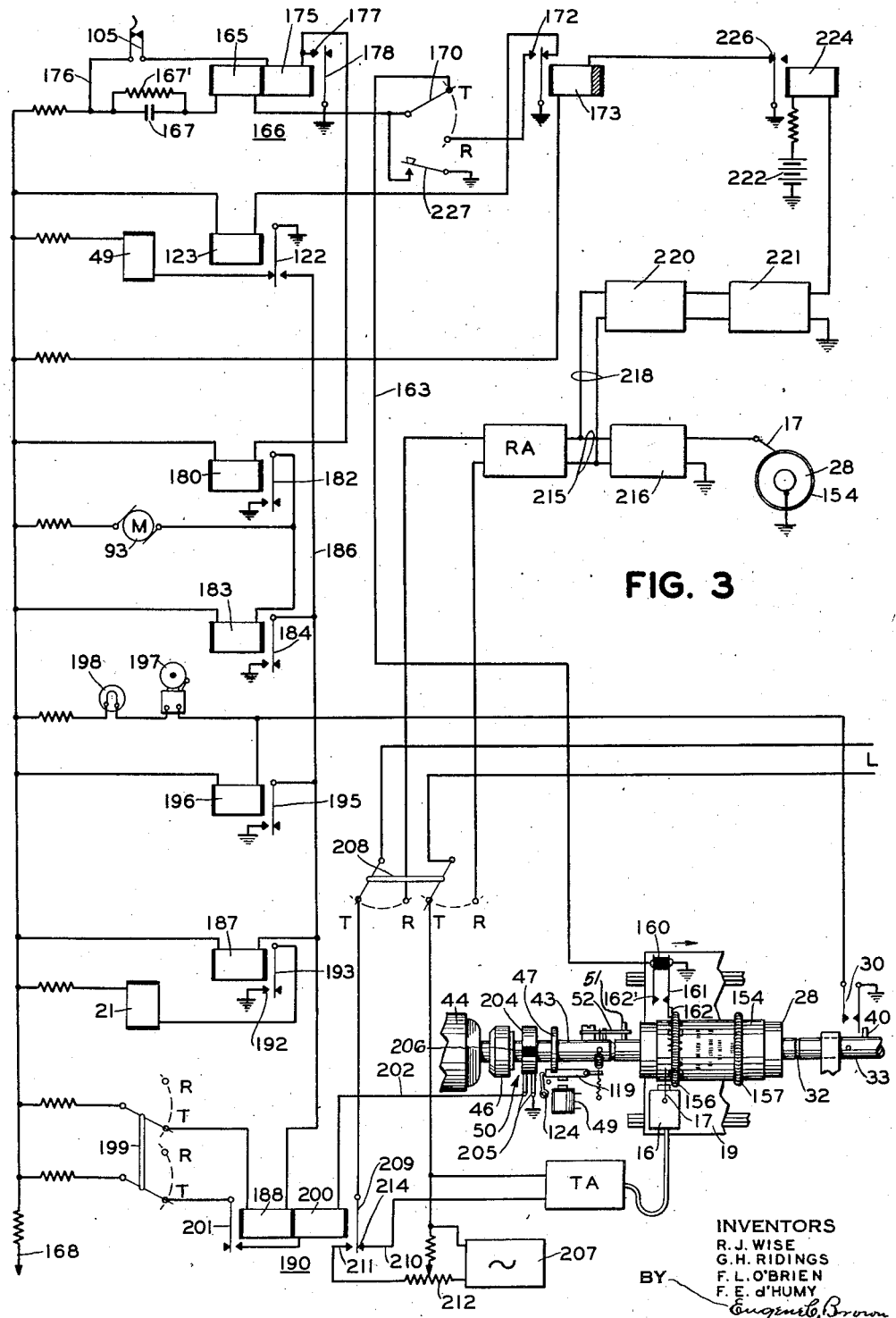
Fig. 3 illustrates diagrammatically the electrical features of a control system in accordance with the invention.

Referring to the drawings and for the present to Figs. 1 to 3 thereof, 10 indicates a base which forms the principal support for the operating parts and driving mechanism of the apparatus and which is adapted to rest upon an apparatus table or other convenient support. The base is provided with guide rails 12 and 14 serving to support slidably the longitudinally movable scanning assembly 15 which comprises the optical pickup system, indicated at 16, for sending messages and if desired the independent stylus 17

(Fig. 2) which may be employed either for transmitting or receiving. The scanning assembly 15 is mounted upon a suitable base member 19 (Fig. 2) which is provided with a suitable number of bearing guide blocks 20 grooved or otherwise formed appropriately to slidably engage the guides 12 and 14. Movement in one direction is imparted to the scanning assembly by means of a rotatably mounted threaded rod 23 which is journalled in suitable bearings (not shown) projecting from the base 10. An apertured guide member 18 mounted on the base 19 of the scanning assembly has secured thereto a member 24 which carries a solenoid 21. The plunger 25 of the solenoid 21 is connected by a link 26 to an elongated member 27 provided with an arcuate threaded recess adapted for engagement with the threads on the rod 23. A tensioned cable, similar to the cable 22 shown in the modification of Fig. 5 of the drawings, is attached to the scanning assembly 15 and serves to return it to the left when the solenoid plunger 25 raises the half-nut 27. The cable may be tensioned by any suitable weight or spring device, for example by a spring reel, such as is used to exert tension on a typewriter carriage.

The subject matter to be scanned, which may be messages or pictures either for purposes of transmission or reception, is carried upon readily interchangeable copyholders preferably in the form of cylinders 28, as shown in the copending patent above referred to and illustrated in Figs. 1 and 2 of the accompanying drawings. Each cylinder 28 may comprise an external barrel portion operatively engageable by either the transmitting or receiving scanning device 16 or 17. Integral with or inserted within the barrel portion of each cylinder is a concentric shaft 29 which for convenience may be hollow. During a scanning operation, each cylinder 28 is carried between centering points which engage the indented or hollow ends of the shaft 29 to maintain the cylinder in a concentric position as described in the patent mentioned above. One of these conical points or centers 32 is formed upon the end of a rod 33 (Fig. 1) which is mounted for reciprocation in bearing apertures provided adjacent the tops of brackets 34 and 35. Rotation of the rod 33 is prevented by a key 37 engaging a notch in the bracket 34. The rod 33 is urged toward the left as viewed in Figs. 1 by means of a spring 38 which engages an outstanding pin 39 secured to the rod. The remaining end of the spring 38 is fixed to any stationary part, for example, to the bracket 35 as illustrated in the drawings. Movement of the rod 33 under the influence of the spring is normally limited by engagement of the conical end of the rod with the hollow end of the shaft 29 of a cylinder 28, but when there are no cylinders in the apparatus, a pin 40 protruding from the shaft 33 engages with the tongue 41 of a normally open switch 30 to close the same. The purpose of the switch 30 will be pointed out in a later description of the control circuits shown on Fig. 3. A conical point 42 which is formed at the end of a driven shaft 43 is complementary to the conical point 32, and it is to be noted that as the rod 33 is permitted to be moved toward the left, the conical points 32 and 42 will enter the ends of the shaft 29 of a cylinder 28 to raise and position it accurately in alignment with the shaft 43 and the rod 33 in the manner pointed out in the patent previously referred to.

The cylinder driving shaft 43 is driven from the motor 44, which is preferably some form of synchronous or speed regulated motor, through a speed reduced drive 45 of suitable character, and a friction clutch 46. A disc 47 mounted on the driven shaft 43 has a notch 48 in its periphery adapted to be engaged by the armature of a magnet 49 to retain the shaft at rest when the magnet is deenergized. A commutator 50 having a single insulated section is also secured to the shaft 43. The threaded shaft 23 may conveniently be driven from a speed reducing drive (not shown) at the opposite end of the motor 44. The gear ratios of the gearing just described and the pitch of the threads of rod 23 are selected so that the rate of longitudinal travel of the scanning assembly 15 and the peripheral speed of rotation of the cylinder 28 cooperate to produce the desired helical scanning of the subject matter on the cylinder. Excellent results are secured in practice for message transmission by selecting these relative speeds so that as the cylinder 28 rotates once, the scanning assembly will move longitudinally a distance of a hundredth of an inch.

To provide for a positive but automatically engageable driving connection between the driven shaft 43 and the cylinder 28, a resilient dog clutch is provided which comprises a radially extending pin 51, which projects from the shaft 29 of each cylinder 28 adapted for use in the device, and a driving member 52 which is pivoted to the shaft 43. The member 52 is urged against a stop 53 secured to the shaft 43 by means of a tensioned spring 54, best shown in Fig. 9, the said spring for the sake of compactness of design partly encircling the shaft 43.

The previously mentioned independent stylus 17, which may be used for recording, is either pivotally or resiliently mounted and is connected by a link 56 (Fig. 2) to the plunger 25 of the previously mentioned solenoid 21 whereby it is raised from its operative position along with the half-nut 27 upon energization of the solenoid in a manner to be described. In the arrangement specifically shown by Fig. 2, the stylus is pivoted at 58 to a fixed part of the assembly 15 and is held in contact with the cylinder by a spring 58', whereas in the modified construction shown in Fig. 5 of the drawings, the stylus indicated by the numeral 17' is resilient and forms the armature of a magnet 59 which serves to withdraw it from contact with the cylinder.

The parts thus far described, with the exception of the clutch 46, the stop disc 47 and the solenoid for raising the half-nut 27, and the stylus 17, are substantially like those disclosed in the copending Wise et al. Patent No. 2,158,391, previously referred to. The automatic feeding and removal in succession of a plurality of cylinders 28 is an important part of the present invention and the apparatus in combination with the parts just described for carrying it out will now be described in detail. It will be understood that the description which is to follow of the details and mode of operation of the automatic apparatus is applicable to both transmission and reception.

As shown in Figs. 1 and 2, a rack or magazine indicated generally on Fig. 2 by numeral 61, is provided to hold the cylinders 28 in readiness to be fed, one at a time, into the scanning device. The magazine 61 comprises two similar rail members 63, only one of which appears in Figs. 1 and 2, carried by corresponding uprights 65 and 66, the latter being secured by suitable fastening means 67 to the base 10. The rail members 63 are each provided with a sloping edge 68 upon which the spindles 29 of the copyholders are supported as they roll toward the operating position. In the event that space does not permit the use of long rail members 63 for holding a considerable number of copyholders, the sloping edges 68 of the rail 63 may be considerably shortened, as shown in Fig. 1, and a plurality of copyholders in readiness for scanning may be supported upon an auxiliary rack or magazine composed of a pair of suitably supported spaced rails 69 (Fig. 2). A pair of resilient upright members 70 secured to the rail members 63 cooperate with the downturned ends 71 of the rails 69 to guide the copyholders 28 onto the sloping edges 68. One of a pair of similar stops 73 is pivotally secured on each of the rail members 63 at 74 and is biased outwardly beyond the edge 68 by a spring 75.

The copyholders, fed one at a time from the magazine 61, are received in a cradle composed of a pair of tiltable supports 77 and 78 which are secured at their ends to a shaft 79, the latter being journalled at one end in a bearing support 81 secured to the base 10. The tiltable supports are notched as indicated at 76, to accommodate the spindles 29 of the copyholders which are fed to the operating position. The forward edges 80 of the notches 76 are in alignment with the edges 68 of the rail members 63 when the cradle is in its upright position. The other end of the shaft 79 is journalled in and projects beyond the support 35 for a purpose to be described.

A pair of similar uprights 84 are each provided with vertically spaced fingers 85 which project outwardly to cooperate with fingers 86 on the uprights 65 and 66. A copyholder, released from the centers 32 and 42 following completion of a scanning operation and resting temporarily on the supports 77 and 78, is discharged onto the upper fingers 85 and rolls from these to the fingers 86 and then to the lower fingers 85, when the supports are tilted by rocking the shaft 79. Additional fingers 85 and 86 may be added if desired, or a suitable receptacle or conveyor may be associated with the base to accumulate or remove copyholders. The extended end 87 of each of the supports 77 and 78 is adapted for engagement with its corresponding detent 73, as will be hereinafter described, when the supports are tilted by rocking the shaft 79, so as to release a copyholder resting on the edges 68. The released copyholder thereupon rolls down until it is in contact with the ends 87 of the tilted supports. When the supports 77 and 78 return to the upright position illustrated in Fig. 2 of the drawings, the fresh copyholder, which passed the stops 73 when they were depressed by the ends 87, is free to roll down and seat itself within the aligned notches 76.

Rocking movements are imparted to the shaft 79 means of an arm 88 (Fig. 2), which is secured to the end of the shaft 79 projecting through the upright 35. The outer end of the arm 88 is provided with a cam follower 89. A spring 90 suitably secured to the base 10 and to a member 91 on the support 78 serves to bias the supports to an upright position.

A cam shaft 92 rotatably supported in bearing brackets 106 is driven from a motor 93 through gears 94 and 95 and in operation of the apparatus this shaft operates the several parts of the automatic copy changing means. The shaft 92 has a cam 96 secured thereon which engages the cam follower 89, described above, for rocking the shaft 79. A second cam 97 cooperates with a cam follower 98 secured to one arm 99 of a bell crank pivoted in a U-shaped bracket 100 carried by the upright 34. The second arm 101 of the bell crank is bifurcated, as shown, to engage a pin 102 extending through the spindle 33. A third cam 103 fixed to the shaft 91 is provided with a cam lobe 104 which opens the switch 105 once in each revolution of the shaft 92. The function of the switch 105 will be later described in connection with Fig. 3 of the drawings. The peripheral configuration of each cam just described is designed so that the notched uprights 77 and 78, the spindle 33 and the switch 105 are operated in proper sequence and for a period of time necessary to accomplish their several functions. To prevent excess overtravel of the cam shaft upon completion of a cycle of operation of the automatic apparatus just described, the motor armature shaft is provided with a brake drum 107 which is engaged under the influence of a tension spring 109 by brake shoes carried on the pivoted arms 108. The brake shoes are released by the spreading of arms 108 under the influence of a magnet 111 which is energized at an appropriate time, in a manner to be described in connection with the electrical features of the apparatus illustrated in Fig. 3.

In operation of the mechanical parts of the apparatus thus far described, the copyholders 28 are prepared in advance and placed upon the rails 69 in any desired sequence. The foremost copyholder occupies the position illustrated in Fig. 2 with its spindle 29 in engagement with both of the detent members 73. It will be assumed for purposes of description, that a copyholder 28 is in position between the centers 32 and 42 as illustrated in Fig. 1 and that its surface is being scanned by the scanning device 15. Its spindle 29 will be out of contact with the notches 76 since the ends of the spindle are engaged by the spindles 32 and 42.

Upon completion of the scanning operation the motor 93 is started, which causes the shaft 92 to commence rotation in a clockwise direction as viewed in Fig. 2. It will be noted that the cam 97 withdraws the spindle 33 toward the right almost immediately by reason of the shape of its peripheral outline. When the spindle 33 is withdrawn toward the right, the copyholder 28 between the centers 32 and 42 is released and drops into the notches 76 in the cradle 72 and at that time the cam 96 causes the shaft 79 to rock, tilting the members 77 and 78 toward the left as indicated by the dot and dash outline. The copyholder, released from the centers 32 and 42, as just explained, rolls along the edges 80 of the notches 76 and is discharged onto the fingers 85 carried by the supports 84. At the same time the upper ends 87 of the supports 77 and 78 press the detent members 73 downwardly as illustrated by the dot-dash lines in Fig. 2, allowing a fresh copyholder 28 to roll down the rail 63 until it is in abutment with the tops of the supports. During this time the shaft 92 has been rotating and as it reaches the end of its cycle of revolution, the cam 96 allows the shaft 79 to rotate under the influence of the spring 90 which restores members 77 and 78 to their upright position. As the cradle 72 starts to rise to its upright position, the copyholder 28 which is resting against the top ends 87 of the cradle rolls down the edges 80 into the notch 76. After the cradle 72 has attained its upright position, spindle 33 is permitted to move to the left under the influence of the spring 38 which causes the copyholder resting in the cradle to be raised into scanning position. Just before the shaft 91 completes its cycle of rotation, the switch 105, which controls the stopping of the copyholder changing motor 93 is opened for a brief time by the lobe 104 of the cam 103. The spring 109 of the magnetic brake permits the motor 93 to coast slightly so that the switch 105 will be reclosed in readiness for the next cycle of operation.

The cyclical functioning of the mechanical parts just described may be controlled in any suitable manner without departing from the spirit of the invention. In Fig. 3 is shown a preferred control arrangement of this invention governed in accordance with the longitudinal portion of a copyholder occupied by any subject matter of the length of a verbal message. The control system of Fig. 3 is illustrated in connection with a combined transmitting and receiving station embodying the invention. For the sake of convenience of illustration, certain of the mechanical parts, appearing in Figs. 1 and 2, are reproduced in diagrammatic form, and also some of the parts which perform different functions, depending on whether the apparatus is used as a transmitter or receiver, are shown twice, once in a group with the transmitter parts and again in a group with the receiver parts. For example, the stylus 17 and the copyholder 28 are shown in the lower right hand section of Fig. 3 and are again reproduced in the upper right hand section with the receiver parts. The parts which cooperate especially to send copy appear generally in the lower left hand corner of Fig. 3 while the recorder parts are grouped generally in the upper right hand part of the figure.

The transmitter parts comprise a motor 44 which, as stated, drives the shaft 43 through a slip clutch 46 of any suitable type to be found in the prior art. The clutch 46 is necessary only when the sender and the receiver at the remote station are driven by motors which do not run at precisely the same speed. When both motors do operate at the same speed, the clutch may be dispensed with in accordance with the invention. The shaft 43 is released for rotation upon energization of the magnet 49 (repeated in the wiring diagram) through the armature 122 and front contact of a relay 123. When the apparatus is used for transmitting, the magnet 49 is not needed and its armature may be retained out of engagement with the disc 47 by means of a manual latch 124.

The copyholder 28 between the centers 32 and 42 is shown as holding a sheet 154 bearing a picture or message of any desired length. If the transmitter-recorder is being used as a receiver, the sheet 154 will be any desired type of recording blank.

In accordance with the invention, the sheet 154 is retained in position on the copyholder 28 by means of elastic retaining bands or spring garters 156 and 157 which are formed of helical spring material. These elastic bands are again shown in Fig. 12 which illustrates a further modification of the invention. The remaining details disclosed by Fig. 12 will be later described. Numerous advantages are possessed by the elastic retaining bands of this invention, as will be apparent to those skilled in the art, and in addition, new and special results accrue from their use with the automatic apparatus disclosed. One important advantage is that several bands may be placed at different points along the copyholder because as scanning proceeds, the bands will roll freely ahead of the scanning device while still maintaining a firm grip on the message sheet.

If the sheet 154 has a written message on its face, it is preferably wrapped around the copyholder 28 so that the lines of written or printed matter will encircle the copyholder. In this way a short message will extend axially along the copyholder for a shorter distance than will a long message. An important feature of the invention relates to the provision of means to ensure a change of copyholders 28 when the end of a message is reached thus effecting an important saving of line time. One way of controlling the means for changing the copyholders through the agency of the annular springs 156 and 157 and a switch 160, is disclosed in Fig. 3 of the drawings.

The switch 160 is suitably mounted on the base 19, preferably adjacent the optical pickup 16, and comprises a resilient tongue or arm 161 which has a projection 162 to engage the band 156, the latter having coils of such diameter that it will roll easily when it is pushed along as the switch 160 moves to the right with the base 19 during a scanning operation. The band 157 is made up of heavier material having smaller convolutions than band 156 and therefore it will not roll as readily as the latter. When the band 157 is located along the copyholder 28 at or just beyond the end of a message, the band 156, as it is propelled by the switch arm 161, will be checked in its free movement as it contacts with the band 157, causing the switch arm 161 to be pressed to the right with respect to the base 19 and into contact with the switch arm 162'. This affords a convenient way of retaining the copy in position as scanning proceeds and provides a simple and effective means for controlling the removal of the copyholder and insertion of a fresh copyholder by the mechanism previously described.

Upon closing of the switch 160 a circuit is completed along the wire 163 to one coil 165 of a relay 166. The circuit including the relay coil and the switch 160 is completed through a condenser 167 of relatively large capacity which is shunted by a high resistance 167'. A suitable source of current 168 serves to supply power for the electrical apparatus disclosed in Fig. 3 of the drawings and is connected to one terminal of the condenser 167 and resistance 167'. A switch 170 is provided so that the coil 165 of the relay 166 may be connected at the point marked T to the conductor 163 when the apparatus is used for transmission or at the point marked R, to the back contact 172 of a relay 173 when the apparatus is used as a recorder. For reasons that will appear, it is desired to have the relay 173 slow to release. The desired results are best obtained with the relay 173 designed to be slow releasing and quick to act upon energization.

The relay 166 has a locking coil 175 which is energized from the current source 168 through conductor 176, switch 105, front contact 177 and the relay tongue 178 to ground. The switch 105 previously described in connection with Fig. 1 of the drawings, is mechanically operated by the cam 103 after the copyholder changing mechanism completes its cycle, so as to open the locking circuit established over the conductor 176.

A relay 180 is energized through the tongue 178 and contact 177 of the relay 166. The armature tongue 182 of the relay 180 completes a circuit from ground through the cylinder changing motor 93 to the current source 168 and at the same time energizes a relay 183 which applies ground through its contact tongue 184 to the conductor 186, to energize the operating coil of a relay 187 and the coil 188 of a relay 190. The relay 187 controls energization of the half-nut lifting solenoid 21 through its grounded front contact 192 and armature tongue 193.

Ground may also be applied to the conductor 186 from the tongue 195 of a relay 196 which is energized by the switch 30 being closed by the pin 40 when the supply of copyholders 28 is exhausted. A bell 197 and a lamp 198 in circuit with the switch 30 serve as warning signals indicating that the machine is idle.

The double pole switch 139, which is disclosed for the purpose of describing the operation of the mechanism as a transmitter, completes the circuit of the operating coil 188 of the relay 190 from the conductor 186 to the source of potential 168. A holding coil 200 of the relay 190 locks the relay through its left hand tongue 201 by way of a conductor 202 and an interrupter or rotating commutator switch 50. The commutator switch in the form shown comprises a metallic disc 204 and the brushes 205 ride on the periphery thereof. An insulated section 206 in the periphery serves to interrupt the circuit established through the conductor 202 at a given point in each revolution of the shaft 116. It should be noted that the relay 190 is always kept energized by its operating coil 188 as long as the relay 166 remains locked. The function of relay 190 is to connect a carrier source 207 with the transmission channel L when the switch 208 is in its position T and the transmitter-receiver is serving as a transmitter. To this end, an additional contact tongue 209 is provided on the relay 190, which upon energization thereof interrupts the connection to the line over the conductor 210 from the transmitting amplifier TA established through a back contact 214 of the relay and completes a connection from the carrier source to the line through a front contact 211. An adjustable pad 212 serves in a well known manner to match the impedance of the source 207 to the line.

The carrier source 207 may generate an alternating current of any convenient frequency suited for transmission over the communication circuit L. Because of the novel arrangement of the electrical features of the receiving apparatus, the fundamental frequency of the source 207 may be close to the carrier frequency produced or modulated by the pickup device 16. This has the advantage of economizing on band width in the channel L necessary for transmission of pictures and the control tone. In use it has been found satisfactory to employ a six thousand cycle source 207, for example, when the subject matter carrier frequency is five thousand cycles. For convenience in the description which is to follow of the electrical features of the automatic transmitter-receiver used as a receiver, the subject matter frequency will be spoken of as five thousand cycles and the receiver operating frequency from the source 207 as six thousand cycles, but it will be understood that other frequencies may be selected without departing from the spirit of the invention.

To adapt the automatic transmitter-receiver for operation as a receiver, several simple pieces of apparatus now to be described are added. The output of the amplifier RA of a suitable type is fed by conductors 215 to an amplifier or detector device 216 of a kind best suited for the method of recording which is employed. The dry method of recording disclosed in the copending application of R. J. Wise et al., Ser. No. 23,928, filed May 28, 1935, is preferably employed in the manner shown in the R. J. Wise Patent No. 2,158,391, referred to above, in which case the device 216 is connected to the recording stylus 17.

A branch circuit 218 leads to a six thousand cycle filter or tuner 220 which feeds into an amplifier and detector 221. The output of the detector 221 is connected to its supply source 222 through a relay 224. The slow release relay 173, previously mentioned, is controlled through the tongue and the back contact 226 of the relay 224.

A push button or other switch 227, suitable for manual operation, is connected to one terminal of the operating coil 165 of the relay 166. One terminal of the switch 227 is grounded and when it is closed momentarily by hand, the automatic apparatus changes a copyholder, as hereinafter described.

The operation of the apparatus of Fig. 3 will now be described with particular reference to the electrical features thereof, the operation of the mechanical parts having already been discussed. Assuming first for purposes of illustration that a message on the sheet 154 is being transmitted, the signals are generated in the pickup device 16 and are given the preliminary amplification therein following which they are amplified by the transmitting amplifier TA and passed onto the line L by way of the contact 214 and the switch tongue 209 of the relay 190, the switch 208 being set at its transmitting position T. After the scanning light beam, or stylus if it is used, of the transmitting device 16 reaches the end of the message, the elastic band 156 presses against the band 157 which was placed just beyond the end of the message and the added mechanical load imposed on the spring 161 causes it to close the contacts 162. Upon closing, these contacts complete a circuit through the operating winding of the relay 166, the switch 170 being in its transmitting position T. This relay operates and is locked through its winding 175 and contact 177. The locking circuit thus established includes the normally closed contacts 105. In addition to locking itself, the relay 166 energizes the relay 180 which in turn applies battery to the copyholder changing motor 93 and also energizes the relay 183 causing the half-nut release solenoid 21 to operate through the action of the relay 187. The relay 183 also energizes the operating winding 188 of the relay 190. The half-nut having been disengaged from the carriage feed screw as previously described, the carriage 19 returns under the influence of its retractile spring while the cylinder 28 is being changed by the mechanism driven by the motor 93, as previously described. The relay 190 locks itself through the tongue 201 by way of the conductor 202 and the brushes 205 which rest on the conducting drum 204. This interrupting circuit, however, is interrupted once for each revolution of the shaft 116. It should be noted that the relay 190 is also kept energized by its operating coil 188 as long as the relay 166 remains locked.

The relay 190 is the tone switching relay which connects the tone generator 207 with the line L as previously explained. The constant frequency tone from source 207 serves to operate the copyholder changing mechanism of the receiver.

When the drum changing mechanism has completed its cycle of operation, at which time the shaft 92 has made one revolution, as was fully explained in connection with Figs. 1 and 2 of the drawings, the contacts of the normally closed switch 105 are opened momentarily by the cam 103. This opening of the contacts releases the tongue 178 of the relay 166 thereby deenergizing the relay 180. The motor 93 is stopped and the relays 183 and 187 are deenergized, and the split-nut reengages the propelling screw, whereupon the carriage 19 commences the next scanning operation. The operating winding 188 of the relay 190 is also deenergized by opening of the contacts of relay 183 but the moment of release of the relay 190 is controlled by the narrow insulated segment 206 of the otherwise solid metallic surface of the ring 204, which revolves with the copyholder drive spindle 43. Therefore, within the time of one revolution of the shaft 43, after the relays previously energized from the conductor 186 are deenergized, the relay 190 is also deenergized and restores the transmitting device 16 to the line L at contact 214.

It will be noted that the commencement of the six thousand cycle tone to the line is controlled by the end of message feature and that this tone is kept on the line while the mechanism is going through the cycle of reloading the machine with a fresh copyholder 28, and the tone is taken off the line at a definite moment with respect to a given point on the revolving message drum. The sheet 154 is placed on the cylinder with the lap of the sheet in a definite position relative to the pin 51 and the insulated segment 206 is so positioned with respect to the driving member 52 that the six thousand cycle tone from the generator 207 is taken off the line at a definite instant with respect to the passage of the lap of the sheet 154 beneath the pickup device 16.

The operation of the apparatus of Fig. 3 as a receiver will now be described. In operation as a receiver the sheet 154 will be in the form of a suitable blank secured to a copyholder 28 by the necessary number of elastic bands 156 or, if desired and without departing from the spirit of the invention, by any sheet holder known to the prior art. The stylus 17 if it is used in place of an exposure lamp or other recording device, will be in contact with the surface of the blank and the switches 170, 199 and 208 will be in their receiving positions. As scanning proceeds, the end of the received message is reached and the distant transmitter will function in the manner just described to connect the tone frequency generator to its outgoing line L. This constant frequency will be passed by the tuner 220 and upon detection by the device 221 will energize the relay 224 causing it to deenergize the relay 173. The circuit of the operating coil 165 of the relay 166 is thus closed through back contact 172 of the relay 173. The relay 123 is deenergized when the armature of relay 173 leaves its front contact. Preferably about one-third of a second delay occurs in the release of the relay 173 after operation of the relay 224. Deenergization of the relay 123 allows its contact tongue to interrupt the circuit of the phasing magnet 49, causing release of the phasing magnet armature 119 and this armature drops into and engages the notch in the disc 47 to arrest rotation of the drum driving spindle 43 while the friction clutch 46 slips and allows the synchronous motor to continue to run at synchronous speed.

The relay 166, energized as explained immediately above, causes the motor 93 to start, the split-nut to disengage under influence of the magnet 21, and the recording stylus 17 to be retracted from the copyholder or recording drum 28. The relay 190 does not function because it has been disconnected by throwing the switch 199 to the receiving position. The cycle of operation explained in detail heretofore is carried out, resulting in the positioning of a fresh copyholder 28 in operative scanning position.

Just as the drum changing mechanism completes its cycle of operation it opens normally closed contacts 105, as previously described in connection with the operation of the machine as a transmitter, and this deenergizes the holding winding of the relay 166, releasing its contact tongue 178. It is to be noted that there is no appreciable current through the winding 165 even though the six thousand cycle tone is still coming in and the contacts of the relay 173 are closing a circuit through the winding 165, in series with the high resistance 167'. Initially this circuit was operable because of the high charging current through the condenser 167. The winding 165 will be again effective after the relay 173 has opened this circuit for about two seconds and allowed the condenser 167 to lose its charge through the high resistance 167'.

It is to be noted that the condenser circuit prevents any false operation of the drum changer due to momentary failures of the six thousand cycle tone during an idle period. This safeguard is obtained by taking advantage of the fact that the drum changer will not normally be operated twice in rapid succession. As long as the remote control signal from the transmitter is received, the split-nut is disengaged, the stylus is lifted from the paper and the phasing magnet 49 prevents rotation of the drum. It will be seen that when the apparatus is operated as a receiver, the relay 166 which is unlocked locally has direct control over the drum changing motor 93 and joint control over the split nut release solenoid 21. If the remote control tone is still being received after the loading operation is completed, the magnet 21 is held operated through the circuit completed through the back contact of the relay 123. The phasing magnet 49, also operated from relay 123 is under direct control of the relay 173 which in turn is directly controlled by the control signal received from the distant transmitter.

When the remote control tone is cut off by the distant transmitter, it being remembered that the moment of cut off coincides with an angular position of the copyholder 28, the relay 224 releases its tongue which moves toward the left, energizing the relay 173, thus opening the operating circuit of the relay 166 and closing the circuit through the relay 123. The phasing magnet armature 119 releases the driving spindle 43 at this instant. The receiving drums, to secure full advantage of the invention, are marked to facilitate putting the sheets 154 with the lap in a given place, and the stop arm 119 is so set that the received copy will be in phase. This preliminary setting automatically takes care of the constant lag in the operation of the phasing apparatus and results in all messages being received in their proper position on the sheet 154. It is to be noted that the phasing feature is not necessary where the receiver-transmitter motors 44 are maintained absolutely in synchronism. With this latter condition phasing may be secured in the manner fully disclosed and claimed in the Wise patent previously referred to.

When the armature 119 of the phasing magnet 49 is released, or attracted in the specific arrangement shown, to release the spindle 43 upon deenergization of the relay 224, the relay 123 deenergizes the split nut and stylus retractile magnet 21, thus putting the machine in receiving condition.

When the steady tone emitted by the generator 207 is chosen within the facsimile band for the purpose of securing spectrum economy, the side band frequencies created by the modulation of the facsimile carrier produce momentary currents having a frequency of the steady tone. These occur only while the transmitting carrier is passing from light to dark portions of the copy, but at times they are sufficiently intense and frequent so that if any quick response detector control arrangement were used, it would result in false reception at the automatic equipment. It will be seen, therefore, that the slow action feature introduced for example, by the relay 173 is an important part of the system since it permits the employment of a control tone within the frequency band appearing in the output of the pickup device 16.

The copyholders may also be changed at any time by closing the manual key 227 to initiate operation of the relay 166, to thereby start the changing cycle.

Figure 5:
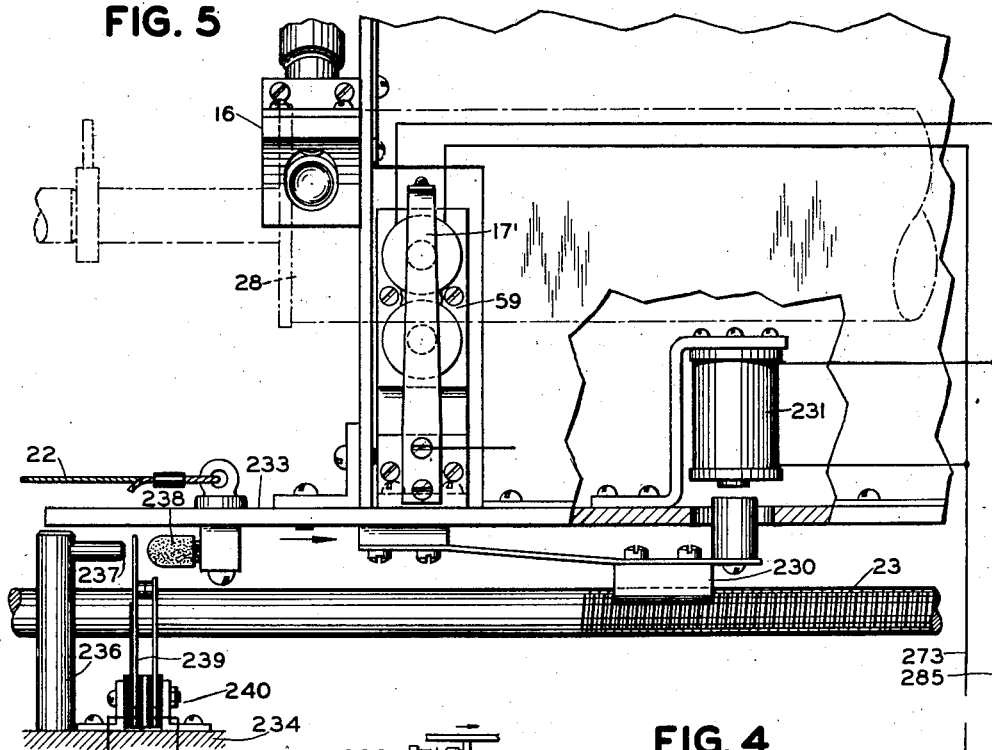
Fig. 5 is a fragmentary view in front elevation illustrating a modified construction of parts shown in Fig. 1.

Referring to Fig. 5 of the drawings, a slight modification of the apparatus of Figs. 1 and 2 is shown, in which the independent stylus 17' is retracted by a separate magnet 59. The split nut 230 which engages the lead screw 23 is withdrawn from operative engagement with the screw by a magnet 231 which corresponds in function with the magnet 21 of Figs. 2 and 3, and the magnets 59 and 231 may be operated by similar control circuits. The electro-optical pickup device 16 may be of any suitable kind and may be similar to that fully disclosed in the Wise patent previously referred to herein.

The optical pickup device 16, the stylus 17' and its associated apparatus, are supported by a movable carriage 233 which may be supported in precisely the same manner as described in connection with the carriage 19 of Fig. 1 of the drawings. The fixed base, a fragment of which is indicated at 234, is provided with a post 236 having a stop 237 which is engaged by a buffer 238, movable with the carriage 233. The buffer 238 is positioned to engage an arm 239 of a normally closed switch 240, to open the switch when the carriage is in its extreme left hand position.

The parts just described constitute a movable scanning system which is biased to the left as viewed on Fig. 5 by the flexible band 22, previously described, which is attached to any tensioning device, as for example the kind used to return the carriage of an ordinary typewriter. When a scanning operation is completed and magnets 59 and 231 are energized, the stylus 17' is withdrawn and the split nut 230 is raised from engagement with the screw 23, whereupon the carriage is drawn to the left by the cord 22 until buffer 238 opens the switch 240, and comes to rest against the post 237.

Figure 4:
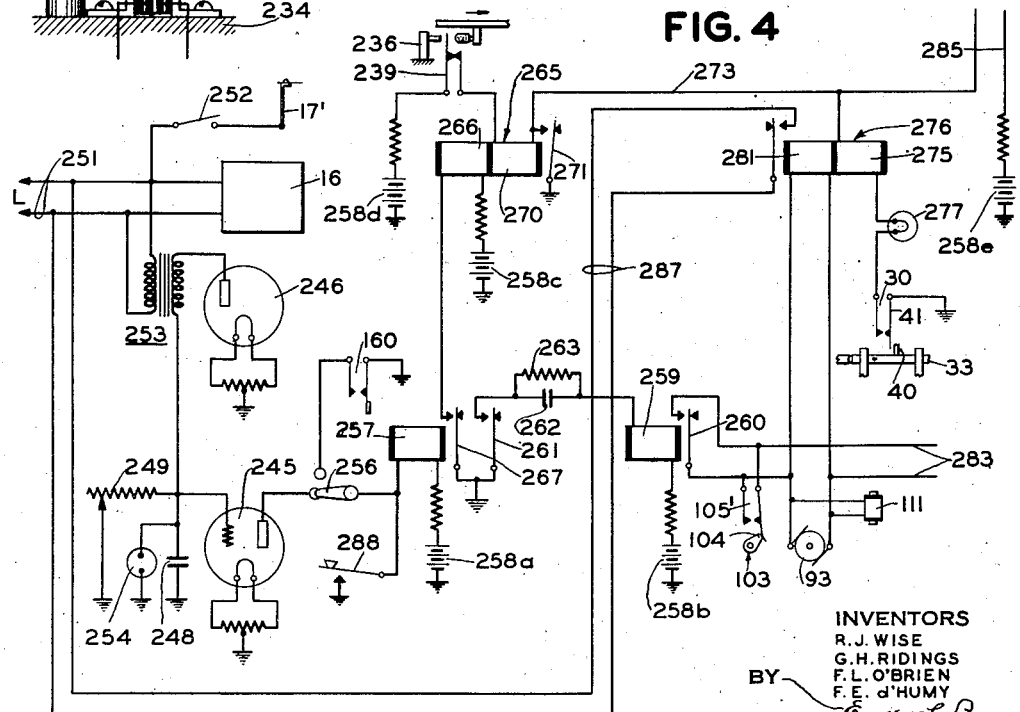
Fig. 4 is a diagrammatic showing of the electrical features of a modified control system.

In the modification of Fig. 4 an alternative method for deriving and transmitting the end of message signal is disclosed, which is based on a change in character of the picture signal. In the illustrative embodiment, operation is caused by the absence of a carrier signal when a blank portion of the copy is scanned for a given time. Control of the apparatus is exercised by a quick-to-act slow-to-release relay or a system of apparatus having these characteristics.

The system disclosed by Fig. 4 comprises a vacuum tube 245, a rectifying device 246, and a condenser 248 shunted by a resistance 249. The communication channel which connects the transmitter-receiver device with a distant transmitter or receiver is indicated by reference character L and the conductors 251 at the terminal station connected to the channel L are in communication with an optical pickup device 16 and may be placed in communication with the independent stylus 17' by means of a switch 252 depending on whether the apparatus is to be used as a transmitter or receiver. The anode of the rectifier 246 is connected to the secondary of a transformer 253 which is in turn connected to the condenser 248. The remaining condenser terminal is grounded as shown. The primary of the transformer 253 is connected across the conductors 251. The condenser 248 is shunted by a current limiting device such as a glow lamp 254, the purpose of which will be explained later.

The anode of the vacuum tube device 245 is connected to one point of a three point switch 256. The movable contact of switch 256 is connected to the operating coil of a relay 257. The remaining terminal of this operating coil is connected to a suitable source of current 258a. A second relay 259 is connected to ground by way of one contact tongue 261 and a make contact of the relay 257, through a condenser 262 shunted by a high resistance 263. Current for the operation of relay 259 is provided from the source 258b. A third relay 265 has its operating coil 266 connected to a stationary make contact which is engaged by a second contact tongue 267 of relay 257. The operating coil 266 is also supplied with energy from the source 258c.

The relay 265 is provided with a holding coil 270 which is adapted to be grounded at one terminal by the grounded relay contact tongue 271. The remaining terminal of the holding coil 270 is connected to the source 258d through the switch 239, which was illustrated and described in connection with Fig. 5 of the drawings. In addition to providing the locking circuit for the relay 265, the contact tongue 271 thereof completes a circuit over the conductor 273 to one coil 275 of a relay 276, the circuit of the coil 275 including in series a lamp 277 and switch 30. The switch 30 is normally open, except when there are no copyholders in the transmitter-receiver, and one terminal of switch 30 is grounded through the contact arm 41. The relay 276 is provided with a second operating coil 281 which is connected in shunt with the cylinder changing motor 93. The motor 93 and the relay coil 281 are separately supplied from a suitable source of power 283 under control of the tongue 260 and the front contact of the relay 259. The switch 105' is operated by the cam 103 somewhat as described in connection with the switch 105 of Figs. 1 and 3 of the drawings. However, the cam 103 holds the switch 105' open when the shaft 92 comes to rest. The tongue 271 and front contact of relay 265 are connected to the magnets 59 and 231 over the conductor 273 which is shown on Figs. 4 and 5 of the drawings. The conductor 285 of Figs. 3 and 5 is connected to the energy source 258e. Separate batteries 258a to 258e have been shown for simplicity of illustration but it is to be understood that a common battery may be employed.

In operation of the apparatus described and assuming that the transmitter-receiver is being operated as a transmitter, a message blank copyholder 28 provided with a message sheet 154 is assumed to be in operative position between the centers 32 and 42 of an apparatus like that disclosed in Figs. 1 and 2 of the drawings. Since the apparatus depends upon an absence of a carrier signal from the pickup device 16, it is preferable to draw a line upon the sheet at one edge thereof and of a length equal to the length of the message. By this means a signal will be sent at least once for each revolution of the copyholder 28 even though the scanning device 16 is traversing the portion of the sheet 154 between the lines of the message. The pickup 16 transmits signals to the distant station over the communication channel L by way of conductors 251. The primary of the transformer 253 is also energized by these signals, the signals appearing in the secondary of the transformer 253 being rectified by the rectifier 246 and serving to charge the condenser 248. So long as the pickup device 16 is emitting a carrier wave, the condenser 248 will be charged. The direction of the current which is passed by the rectifier 246 is such as to charge the condenser 248 negatively with respect to the grid of the tube 245. The adjustable resistor 249 forms a very high resistance leak across the condenser 248. The glow tube 245 sets an upper limit to the voltage charge that can be accumulated by the condenser 248. Since the condenser 248 is preferably of small capacity, a few cycles of carrier current emitted by the pickup device 16 will charge the condenser 248 to the breakdown point of the glow lamp 254. This negative voltage is more than sufficient to reduce the plate current of the vacuum tube 245 to zero and therefore to keep the relay 257 deenergized as long as carrier current is received at relatively frequent intervals from the pickup device 16.

When line signals cease, the condenser 248 gradually discharges through the shunting resistance 249 and reduces the negative bias on the grid of the tube 245. If signals from the pickup 16 remain off for a sufficient period of time, the grid bias of the tube 245 will be reduced to such a point that plate current sufficient to operate the relay 257 will be produced. This timing can be regulated by the value of the resistance 249 which shunts the condenser 248. The neon lamp 254 has the advantage of making the delay period of the system substantially independent of the amplitude of signals emitted by the pickup device 16. It will be understood that a similar arrangement including a condenser 248 and a resistance 249 fed through a rectifier 246 by line signals is also used at the distant transmitter-receiver which, of course, operates as a receiver.

When the plate current in the tube 245 rises to a value sufficient to operate the relay 257 in the manner explained above, its right hand tongue 261 causes the relay 259 to be energized. This latter relay does not remain operated, however, because of the large condenser 262 in series with its winding serving to limit its operating time to a relatively short period. Resistance 263 has a relatively high value and serves to discharge the condenser when the circuit is finally opened by the relay tongue 261. The contact of relay 259 remains closed for a sufficient time to start the motor 93 and advance the worm gear 94 and the cam 103 (Fig. 1) to a point beyond which the switch 105 is closed. The motor 93 will draw current through the switch 105 after the contacts of relay 259 have opened and continue to run until the gear 95 has completed one revolution, as fully explained in connection with the mechanical features disclosed by Figs. 1 and 2. When the gear 95 has completed one revolution, the switch 105 is opened by the cam 103, thus stopping the motor, the contacts of relay 259 having opened in the meantime. The mechanical parts function to replace the copyholder 28 with a fresh copyholder in the manner explained above.

When the relay 257 is energized at the end of a message by the rise in the plate current of the vacuum tube 245, the split nut 230 and the stylus 17' are raised because of energization of the coil 266 of relay 265. The carriage starts its movement toward the left at this time. The relay 265 locks up through contacts 239 to insure that the magnets 231 and 59 will not be released until the carriage has completely returned, at which time the switch 239 is opened.

If no copyholders are available to be received by the machine at the end of transmission or reception of a message, the switch 30 is closed, which lights the signal lamp 277 and energizes the coil 275 of the relay 276 and also energizes the magnets 231 and 59 over conductor 273. The relay 276 short circuits the line L over conductors 287. The relay 276 has its winding 281 connected across the terminals of the motor 93, as described, for the purpose of causing the line L to be short circuited over conductors 287 during operation of the automatic drum loading mechanism whereby no false signals can be transmitted to the line when the motor is operating. Such false signals if transmitted would be taken by the automatic machine at the receiving end as an indication of the beginning of a new message which would cause faulty operation.

The operation of the arrangement of Fig. 4 when the transmitter-receiver is being used as a receiver will be apparent, it is believed, from the foregoing description. However, a brief summary of its operation as a receiver will be given. It will be assumed that the independent stylus 17' is to be used for recording purposes and therefore the switch 252 will be closed. Incoming signals will energize the primary of the transformer 253 in precisely the same manner as though these signals were being produced by the local pickup device 16. These signals in turn will be rectified to control plate current in the vacuum tube 245 which controls the relay 257 to produce operation of the drum changing mechanism.

The switch 256 may be connected to its upper point in circuit with the switch 160 which is adapted to be engaged by the elastic copyholding bands. Therefore, when the switch 256 is in its upper position, the system is the equivalent of that already described in connection with Fig. 3. A push button 288 is connected to relay winding 257 to cause manual energization of the relay 257 when desired so that a copyholder 28 may be ejected and replaced with a fresh copyholder at any time.

Figure 6:
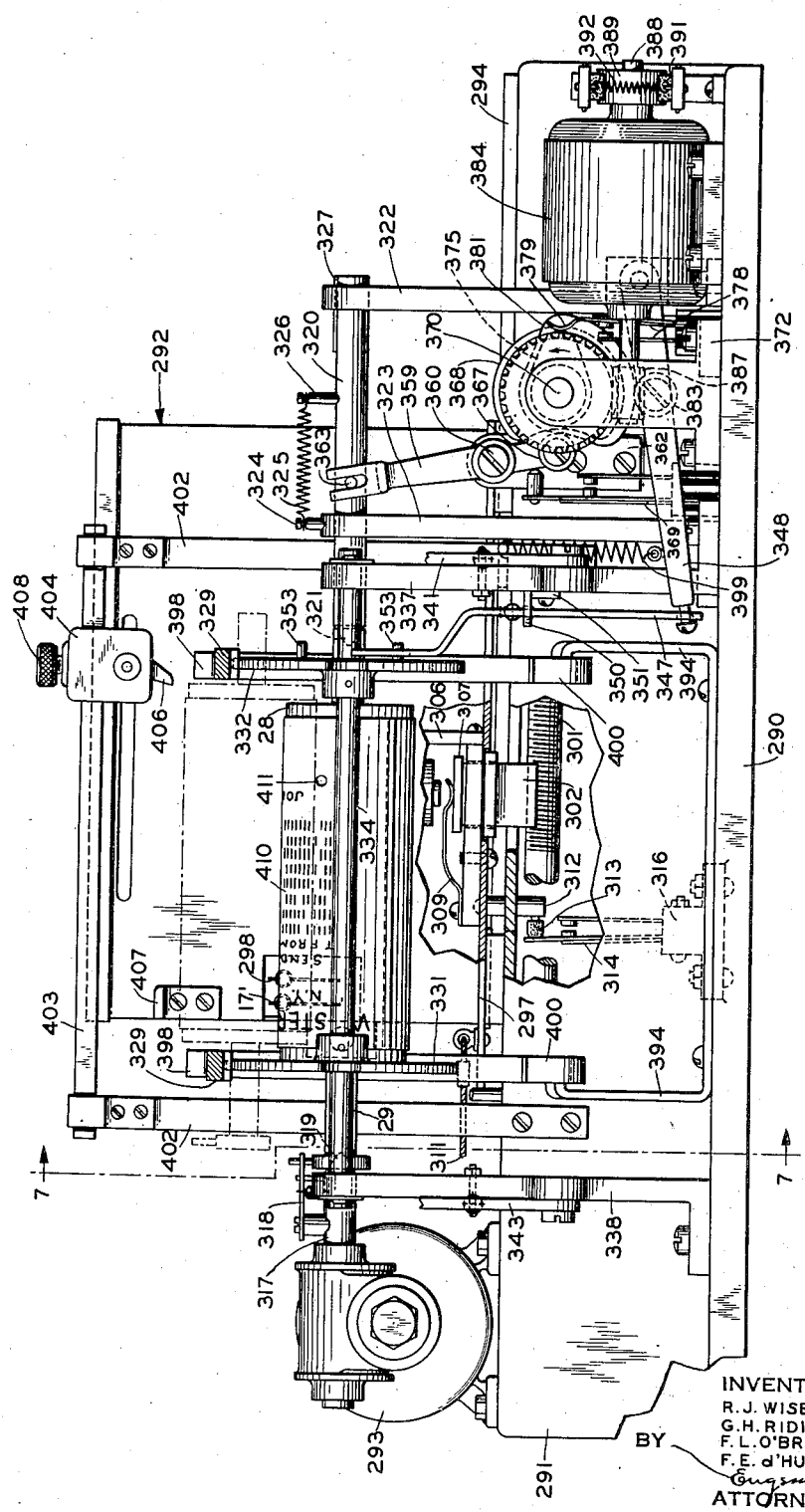
Fig. 6 is a view in front elevation of a facsimile transmitter or receiver embodying the invention in a modified form, certain of the parts being broken away and others shown in cross section on line 6—6 of Fig. 7.

Referring now in detail to Figs. 6 and 7, which illustrate a modification of the mechanical parts of a copyholder changing apparatus embodying the present invention, numeral 290 indicates a supporting base provided with a rearwardly positioned raised portion 291, the latter serving to support a carriage 292 and the scanning motor 293. To this end a guide rail 294 and a groove 295 (Fig. 7) are formed on and in the top surface of the portion 291. The carriage 292 has one or more groove engaging members 296 and also one or more guide surfaces 297 which engage respectively the groove 295 and the rail 294, to permit the carriage 292 to slide transversely as viewed on Fig. 6, but at the same time constraining it to move rectilinearly with respect to a copyholder in operative scanning position. The carriage 292 carries an optical pick-up device 16 of the kind previously mentioned and also carries an auxiliary control stylus 298 (Fig. 7), the purpose of which will be described in connection with the electrical features of the modified apparatus disclosed in Fig. 8. The carriage is propelled during the scanning operation by a lead screw 301 which operatively engages a threaded arcuate recess in an elongated armature member 302. The screw 301 is mounted for rotation in suitable bearings 304 on the portion 291, one of which appears on Fig. 7 of the drawings. The screw 301 is driven by gearing (not shown) from the scanning motor 293. The elongated portion of the member 302 is slidable vertically in an aperture in the base of a magnet supporting frame 306. The top of the member 302 is formed as indicated at 307 so that it serves as an armature for the magnet 308, supported by the frame 306. A spring 309 holds the threaded recess firmly in engagement with the screw 301 so that as the screw is turned in the proper direction, the carriage will be propelled toward the right as viewed in Fig. 6. Upon disengagement of the member 302 from the screw when the magnet is energized, a cord 311 connected to a suitable tensioning device draws the carriage 292 toward the left, an operation which is accomplished automatically upon completion of a scanning operation. A pin 312 secured on the carriage 292 and accommodated by a suitable slot in the raised portion of the base has a switch engaging member 313 thereof which is positioned to move the flexible switch arm 314 of a switch 316 of the normally closed type, when the carriage 292 completes its travel to the left.

The scanning motor 293 imparts driving power to a copyholder spindle or shaft 317 which is equipped with a copyholder driving means 318. The copyholder driving means includes parts substantially identical with the parts 52, 53 and 54 illustrated on Fig. 1 of the drawings, therefore a detailed description of these parts will not be repeated. The spindle 317 is also provided with a conical point 319 adapted to engage one end of the shaft 29 of the copyholder 28, which is brought into operative position by the automatic mechanism to be described. A reciprocable stationary spindle 320 having a conical point 321 is positioned in alignment with the spindle 317 by means of vertical supporting members 322 and 323, the latter having a projection 324 to which is anchored a biasing spring 325. The remaining end of the biasing spring is connected to a pin 326 which projects from the spindle 320, whereby the spindle 320 is biased toward the left as viewed in Fig. 6 of the drawings. To prevent rotation of the spindle 320, a key 327 engages the notch formed in the spindle receiving aperture in the upright 322.

Copyholders 28, which initially are stored on a rack comprising rails 329 (Fig. 7) are fed into operative engagement with the centers 319 and 321 by modified apparatus embodying the invention, which will now be described. A pair of similar discs 331 and 332, notched about their peripheries as indicated at 333, are secured to a shaft 334, the latter being mounted for rotation in bearing brackets 337 and 338 secured to the base 290. In the embodiment shown each disc is provided with four notches 333 aligned with a like number of notches in the cooperating disc. However, it will be understood that the discs 331 and 332 may, if desired, be provided with a greater or less number of notches and the operating mechanism for the discs modified accordingly.

The bracket 337 pivotally supports, on a horizontal projection 340, a lever 341 which is biased inwardly by a tensioned spring 342. A similar lever 343 is carried in a like manner by the upright 338. Each lever 341 and 343 is provided with a roller 345 and these rollers engage a pair of aligned notches 333 to prevent free rotation of the discs 331 and 332. Intermittent rotary movement is imparted to the discs by a lever 347 pivotally carried at its end upon an oscillatable lever 348. The lever 347 is apertured at its end for engagement with a screw or other suitable fastening means at the end of the lever 348 (Fig. 6). As the aperture which receives the screw 348 is slightly enlarged so that the pivotal connection between the two levers 347 and 348 is loose, a guiding notch is provided in the horizontal arm 350 of a bracket 351 secured to the upright member 337. Pins 353, corresponding in number to the number of notches 333 in each disc and equally spaced circumferentially of the disc 331, are adapted to be engaged by a notch 354 formed at the upper end of the lever 347. The lever 347 is elongated as indicated at 356 so as to insure its engagement with one of the pins. A spring 357 anchored to the lever 347 and the bracket 351 biases the said lever inwardly so that its extension 356 presses against the pin 353 in position at any time in the cycle of rotation of the discs.

A crank member 359, pivotally carried at 360 upon a bracket 362, is bifurcated and notched at its upper end for engagement with pins 363 projecting from the spindle 320. As the lever 359 is rocked it will be seen that the spindle 320 will be reciprocated. The arm of the lever 359 which extends beyond the pivot point 360 is provided with a cam follower 367, the latter bearing against the periphery of a cam 368 carried by a cam shaft 370. It will be noted that the spring 325 extends to retain the follower 367 in engagement with the peripheral surface of the cam 368. When a copyholder 28 is between the centers 319 and 321, the roller 367 stands away from the periphery of the cam which allows for added movement of the spindle 320 when the supply of cylinders 28 is exhausted. If the machine cycles and there is no cylinder in position to be grasped by the centers, the spindle 320 moves further to the left allowing the normally open switch 369 to operate the signal 371, as clearly shown in Fig. 8. The bearing block 372 secured to the base 290 rotatably supports the shaft 370 at one end and the remaining end is rotatably carried by a bearing block 373 integral with or carried by the forward wall of the portion 291 of the base.

A second cam 375 is keyed on the shaft 370 and the lobe thereof is so positioned that a normally closed switch 378 is opened by engagement of the said lobe with the resilient arm 379 of the switch on initial movement of the shaft 370 from its rest position. A third cam 381 of sector shape secured to the shaft 370 engages a cam follower roller 383 carried by the pivoted lever 348.

Driving power is imparted to the shaft 370 from a motor 384 through a worm gear 386 and a worm 387. The armature shaft 388 of the motor, to which is secured the driving worm 387, also carries a brake drum 389 which is frictionally engaged by brake shoes 391 which tend to stop rotation of the shaft under the influence of the tensioned spring 392. The brake is similar to the brake disclosed by Fig. 1 of the drawings and is released by a magnet when power is applied to the motor 384.

A pair of brackets 394 secured to the base 288 support a pair of similar guide members 396, as best shown in Fig. 7. These guide members are arcuately curved at their inner ends, as indicated generally at 397, said curved portion having a radius slightly greater than the radius of the discs 331 and 332. Each member 396 is positioned substantially in the plane of one of these discs and they serve in conjunction with the discs to receive the shaft 29 of a copyholder resting in the notches 333 of the discs. An upstanding end 398 is provided on each member 396. The lower straight portions of the members 396 serve to receive copyholders 28 which are discharged from the apparatus following a scanning operation. Copyholders 28 resting on the flat portions of the members 396 are retained in position by the upturned ends 400 pending their removal.

A pair of stationary brackets 402 support a bar 403 on which is slidably mounted a switch 404. The switch 404 is provided with an operating tongue 406 positioned in the path of movement of an operating lug 407, the latter being conveniently secured to a part of the carriage 292. The switch 404 may be clamped in any desired position on the bar 403 by means of a set screw 408 so as to cause automatic return of the carriage at a given point in its travel.

In operation of the mechanical parts of the modified copyholder changing apparatus thus far described, the copyholders are prepared in advance in the same manner as for use in the apparatus of Figs. 1 and 2 and are placed on the rails 329, in any desired sequence. The foremost copyholder rolls down the rails 329 to rest in the uppermost axially aligned notches 333 of the discs 331 and 332. It will be assumed for purposes of description that a copyholder 28 is in position between the centers 319 and 321 as illustrated by Fig. 7 and that its surface is being scanned by the scanning device 16.

Upon completion of the scanning operation which is in progress the motor 384 is started, in a manner to be described, which causes the shaft 370 to rotate in a counter-clockwise direction as viewed on Fig. 6. As the shaft 370 commences to rotate, the switch 378 is permitted to close and the upper end of the lever 359 is swung to the right reciprocating the spindle 320 to the right to withdraw the center 321 from engagement with the shaft of a copyholder 28. Following this the cam 381 permits the lever 348 to move upwardly under the influence of the spring 399 which causes the pusher 347 to turn the discs 331 and 332 a quarter of a revolution. The discs are stopped following the quarter turn by engagement of the rollers 345 with a pair of axially aligned notches 333 in the discs 331 and 332. When the discs have executed a quarter turn, the copyholder 28 which was in operative scanning position is released from between the members 396 and the discs and rolls down the inclined part of the rails 396. The copyholder which occupied the uppermost pair of notches is moved into operative scanning position in alignment with the spindles 317 and 320. At this time rotation of the shaft 370 has caused the lower end of the lever 359 to again enter the notch 369 in the cam 368 so that the spindle 320 moves to the left to cause the shaft 29 of the fresh copyholder to be engaged by the centers 319 and 321. Also the cam 381 depresses the lever 348 to its initial position ready for its next upward movement, and the lobe of the cam 375 opens the switch 378 which it will be noted remains closed for the greater part of the time occupied by one rotation of the shaft 370.

Figure 8:
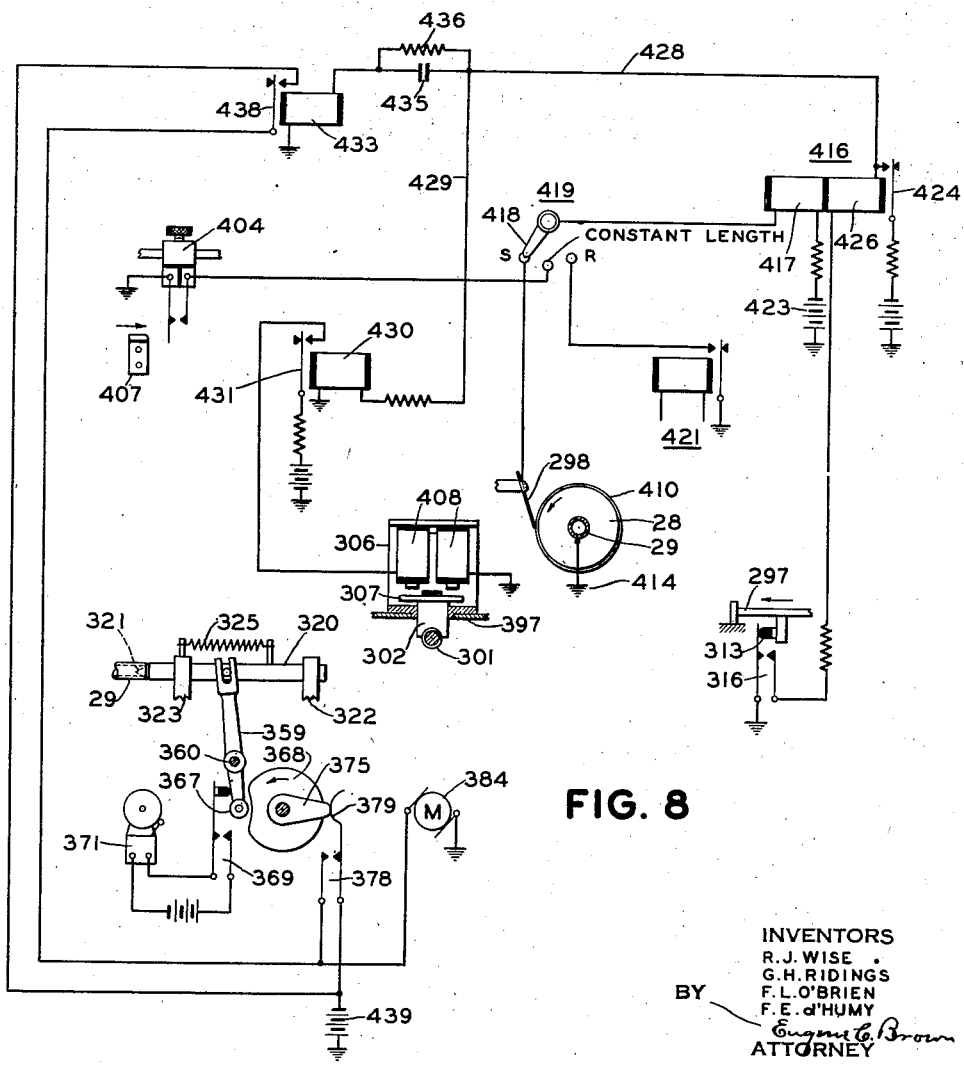
Fig. 8 is a diagrammatic showing of the electrical features of a modified control system suitable for use with the apparatus of Figs. 6 and 7.

As was explained in connection with Figs. 1 and 2 of the drawings, the cyclical function of the modified mechanical parts just described may be controlled in any suitable manner without departing from the spirit of the invention. In Fig. 8 is shown a form of control preferred for use with the apparatus of Figs. 6 and 7 and governed in accordance with the longitudinal portion of a copyholder occupied by a picture or the length of a verbal message.

The control arrangement of Fig. 8 is adapted to operated by an impulse received from the auxiliary stylus 298 shown in Fig. 6 of the drawings, and in order that this impulse may be received at the proper time, the sheet 410 having the copy thereon to be transmitted is perforated as indicated at 411, Fig. 6, at or slightly beyond the end of the subject matter being transmitted. The independent stylus 398 is reproduced on Fig. 8 of the drawings and it will be noted that when it reaches a position such that the perforation 411 passes beneath it, an electrical circuit is completed through the metallic body of the copyholdrer shaft 29 to ground, as indicated at 414.

A relay 416, provided with an operating winding 417, controls the functioning of the discs 331 and 332 and the mechanical parts associated therewith. The operating winding 417 is connected to the movable contact 418 of a three point switch 419. One point, labeled "Send" in the drawings, is connected to the auxiliary stylus 298. A second point of the said switch is connected in a circuit including the adjustably positioned switch 404 and the third point of the switch 419 marked "Rec" is connected in circuit with the contacts of a relay 421. When a message is to be transmitted, assuming for the purposes of the description that the transmitter receiver is being operated as a transmitter, the contact 418 is turned to the position marked "Send" and as scanning proceeds, the auxiliary stylus 398 eventually reaches a point in its travel where the ground circuit previously described is completed through the perforation 411 in the sheet 410. When this occurs, the operating coil 417 of the relay 416 is energized from the current source 423. This causes the relay 416 to attract its armature 424 which closes the circuit through a locking coil 426 and to ground through the contacts of the normally closed switch 316. The armature 424 of the relay 416 also completes a circuit over the conductor 428 and conductor 429 through a relay 430. The armature 431 of the relay 430 completes a circuit to energize the half-nut lifting magnet 308.

In addition to these functions, when the relay 416 attracts its armature 424, a circuit is completed through a relay 433 over the conductor 428. A condenser 435 of relatively large capacity is included in circuit with the operating coil of the relay 433 and the condenser is bridged by high resistance shunt 436. Upon attraction of the armature 438 of the relay 433, a circuit, which connects the motor 384 to the supply source 439, is momentarily closed. The relay 433 is closed for a short time only by reason of the early decay of the changing current of the condenser 435. However, the contacts of the relay 433 are closed for a time which is sufficiently long to permit closing of the contacts of the switch 378, which causes the motor 384 to continue to run until the automatic copyholder changing apparatus has completed its cycle of operation, whereupon the cam 375 opens the contacts of the switch 378, stopping the motor.

It is believed that operation of the electrical apparatus just described will be obvious from the detailed description immediately foregoing. As before, the device may be used either as a transmitter or a receiver and if it is to be operated as a transmitter, the switch 419 will be placed on the point labeled "Send" which connects the auxiliary stylus 298 to the operating coil of the relay 416. When scanning of the message or other subject matter appearing on the sheet 410 has been complete, contact is made with the portion of the cylinder underlying the sheet at the perforation 411 which causes the operating coil 417 of the relay 416 to be energized. The armature of the said relay draws up and is locked as explained in the foregoing. Where a plurality of copies of standard length are to be transmitted, the switch 404 is moved to a position corresponding to the length of the standard message and clamped in position by means of the thumb screw 408. When this feature of the invention as embodied in Fig. 6 is to be used, the switch 419 is set to its middle position and the switch 404 causes automatic return of the carriage 292 and operation of the copyholder changing apparatus in the same manner as the auxiliary stylus 298.

If the transmitter recorder of Fig. 6 is to be used as a receiver, the sheet 410 will be of a suitable nature to record signals so that with the switch set to the position labeled "Rec.," signals may be recorded on the surface of said sheet and any suitable signal may be transmitted from a distant transmitter to energize the receiving relay 421 so as to cause operation of the controlling relay 416. A method of supplying a signal to the receiving relay 421 will be later described in connection with Fig. 11 of the drawings.

Figure 9:
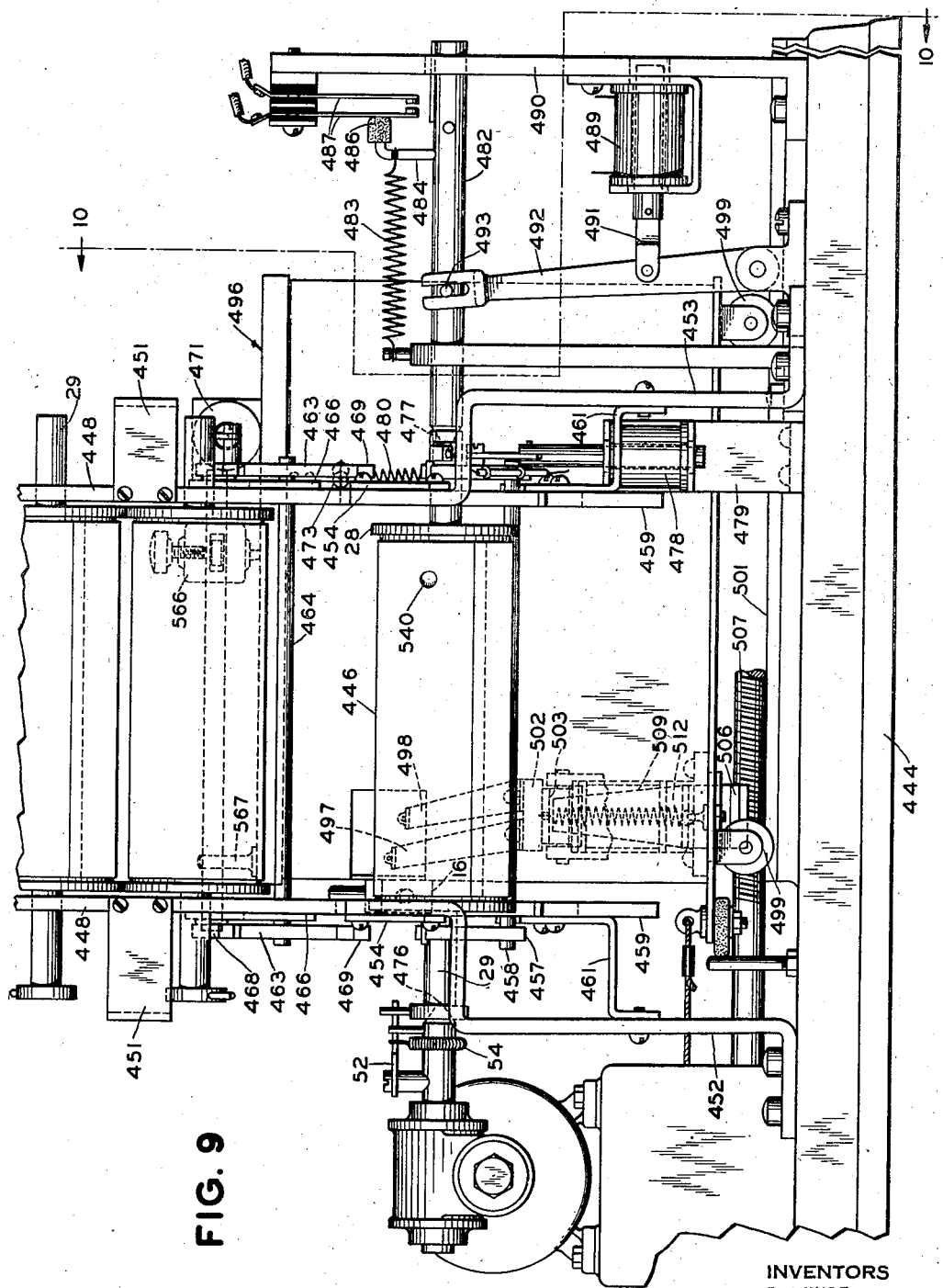
Fig. 9 is a view in front elevation of a facsimile transmitter or receiver embodying the invention in another modified form.
Figure 10:
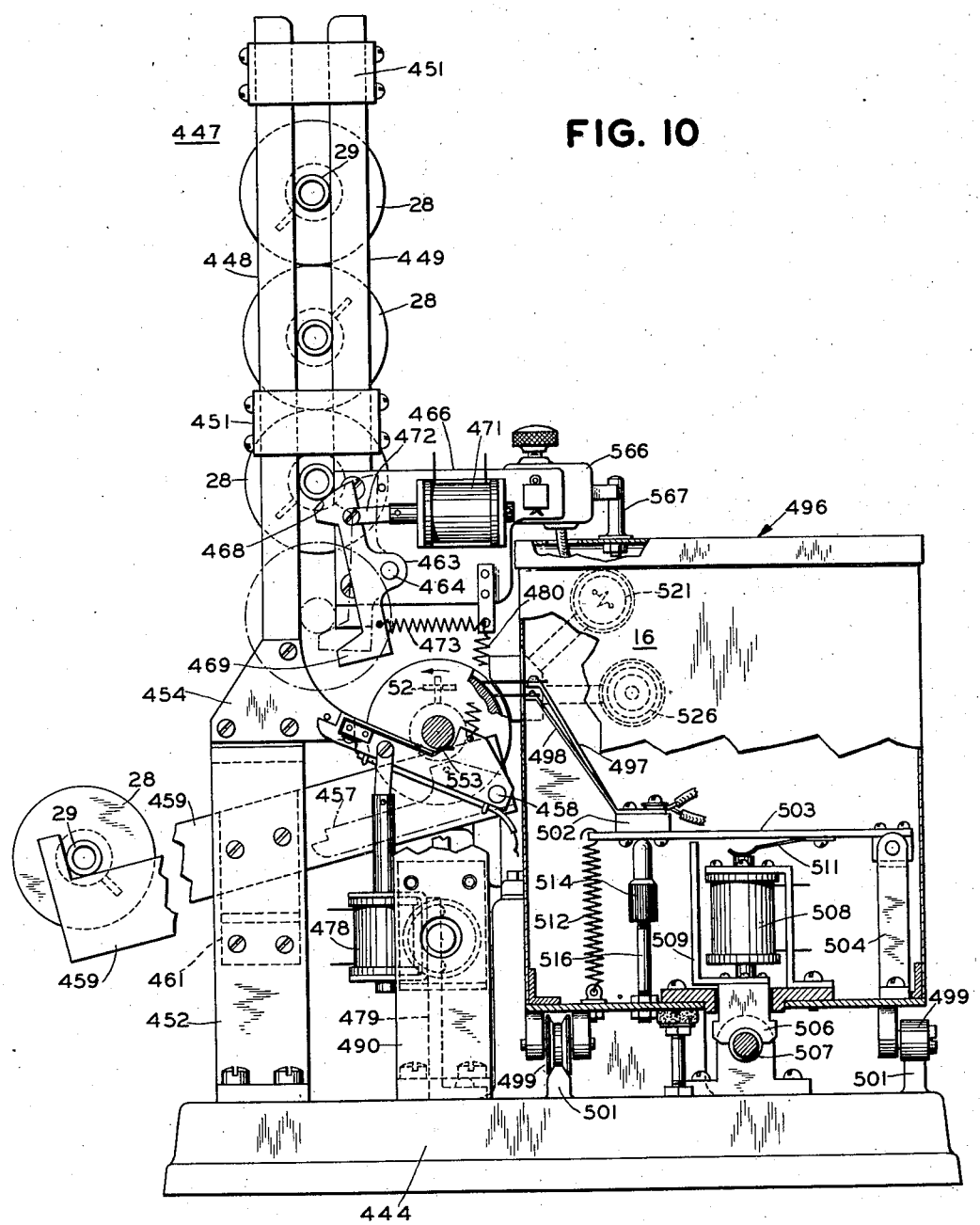
Fig. 10 is a sectional elevation taken on line 10—10 of Fig. 9.

Figs. 9 and 10 illustrate the mechanical details of a further modification of a copyholder changing apparatus embodying the present invention in which cyclical operation is produced by electro-magnetic means which are energized in proper sequence, as the apparatus functions, to change copyholders 28.

The apparatus is mounted on a base member 444 which supports the several parts of the apparatus upon suitable brackets as shown. The copyholders 28 bearing message sheets 446 are carried in a magazine 447 (Fig. 10) which comprises a pair of uprights 448 and 449 spaced apart by members 451 a distance approximately equal to the diameter of the shaft 29 of a copyholder. The upright members 448 and 449 are duplicated at the opposite end of the machine so that a series of copyholders, for example four, may be supported one above the other so that they may be released one at a time. The magazine 447 is supported upon similar brackets 452 and 453 which extend upwardly from the base 444. The upper ends of these brackets are offset inwardly and provide mounting supports for plates 454, each of which has an arcuate edge 456 for guiding the cylinders forwardly onto a pair of spaced swingable cradle members 457, pivotally connected by a rock shaft 458, to a pair of rail members 459, which are secured by brackets 461 to the brackets 452 and 453.

The copyholders contained in the magazine 447 are released one at a time by means of latch or escapement members 463. The escapement members 463 are secured to a shaft 464 for rotation therewith, the said shaft being journaled for rotation in aligned apertures in supporting plates 466, one of the said supporting plates being secured to the rail 449 and the second supporting plate also secured to the corresponding upright 449 at the opposite end of the device. Each escapement member 463 is provided at its upper end with an arcuate surface 468 upon which the lowermost of the copyholders 28 of the magazine 447 rest. A toothlike projection 469 extends laterally from the lower end of each escapement member 463 to retain a single copyholder just prior to its release so that it may be seized by the scanning device at the proper time. A solenoid 471 carried by one of the supporting plates 466 has its core connected by a link 472 so as to impart a clockwise rocking movement to the escapement member 463 against the tension of the spring 473. When the escapement member 463 is returned by the solenoid 471 to the position indicated by the dot and dash outline, the copyholder which was supported upon the arcuate surface 468 will be permitted to drop so as to be caught by the spaced projections 469. At the next movement of the escapement members 463, their arcuate surfaces 468 will be in position to prevent premature dropping of the copyholders in the magazine 447 and the copyholder caught by the projection 469 will be released so as to be picked up by the scanning apparatus.

The arrangement which supports a copyholder, released from the projections 469, in position just prior to a scanning operation and which receives a copyholder following a scanning operation consists principally of the spaced parts 457 which have shoulders 474 thereon providing notches in which the copyholder rests before it is picked up by the centering points 476 and 477. A solenoid 478 supported from the bracket 479 draws the parts 457 downwardly against the action of a spring 480 to allow a copyholder to be discharged directly onto the spaced rails 459.

The parts which impart drive to the shaft 29 of the copyholder during its scanning operation are substantially identical with those described in connection with Fig. 1 of the drawings and the details of the description need not be repeated here and the method of supporting the non-rotating spindle 482 which is provided with the centering point 477 is substantially like that disclosed in Fig. 6 of the drawings. The spring 483, which urges the spindle 482 toward the left as viewed on Fig. 9, is connected to an upwardly projecting post 484 on the spindle, the said post carrying a contact engaging member 486. The latter member, upon movement of the spindle 482 towards the right, serves to close a normally open switch 487. The switch 487 and a solenoid 489 are carried by the bracket 490, in which one end of the spindle 482 slides.

A reciprocating movement is imparted to the spindle 482 by the solenoid 489, through the link 491, pivotally connected to the core of the solenoid, and an oscillating lever 492, the upper end of which is bifurcated and notched to embrace a pin 493, projecting laterally from the spindle 482.

A carriage 496 (Fig. 10) carries an optical scanning device 16 and also a pair of styli 497, 498. The stylus 498 is precisely the same in function as the auxiliary stylus 298 of the embodiment described in connection with Fig. 8 of the drawings. The carriage 496 travels upon rollers 499 along the pathway provided by the rails 501, the latter being integral with or secured to the base member 444. One set of rollers is grooved as shown so as to cause the carriage 496 to move parallel to the shaft 29 of the copyholder in scanning position between the centers.

The previously mentioned stylii 497 and 498 are supported upon an insulating member 502 which is in turn secured to a frame 503, the latter being pivoted to a suitable stationary support 504. The carriage 496 is propelled by a half-nut member 506, which may be drawn upwardly out of engagement with the lead screw 507 by energizing the solenoid 508.

The stylus supporting frame 503, when the solenoid 508 is energized, is raised by a member 509, secured to and projecting upwardly from the member 506. A resilient member such as a spring 511, connected to the frame 503, engages the top of the solenoid 508 to press the member 506 into engagement with the screw 507. The frame 503 is held down by a spring 512 stronger than the spring 511, and the downward limit of its travel is set by an adjustable stop 514 threaded on a post 516.

Referring to Fig. 11, details of the electrical features of a control arrangement suitable for use with the apparatus of Figs. 9 and 10 are shown. The details of an optical scanning device represented by the numeral 16 on Figs. 9 and 10, are diagrammatically shown on Fig. 11 of the drawings. Such a pickup device comprises two independent sources of illumination 520 and 521. A rotary shutter or light chopper 523 having spaced slots adjacent its periphery interrupts light rays from the sources 520 and 521 which are incident on the photocells 524 and 526, alternately. This pickup arrangement is substantially that shown in copending application of R. J. Wise, Ser. No. 57,019, filed December 31, 1935 now Patent No. 2,176,442. As explained therein, when white portions of the copy are scanned, the output of the photocells 524 and 526 are substantially equal and no signal appears in the primary 527 of the transmitting transformer 528. When, however, black portions of the copy are scanned, the photocell 526 is inactive and a carrier wave, the frequency of which is determined by the speed of the chopper 523, appears in the transformer 528 and is sent to the line L through the right hand contacts of the switch 529. It will be observed that if the scanning source 521 is cut off, source 520 will activate the photoelectric device 524 causing the apparatus to transmit an alternating current to the line L. Such alternating current may be used as a carrier for a signal operating frequency. One way of accomplishing this result, shown in Fig. 11, employs direct current from the source 531 to saturate the core of the transformer 528, at the same time that an alternating current is supplied to the transformer 528 through the transformer 532. The circuit which includes the secondary of the transformer 532 and the direct current source 531 may be closed at the contact 534 of the relay 536. An additional contact 538 of this relay serves simultaneously to interrupt the supply current to the scanning illumination source 521, so that when the relay 536 is energized in a manner to be described, the light from source 521 will be cut off and the circuit including the source of direct current 531 and the secondary of the transformer 532 will be closed.

When the device is in operation as a transmitter, scanning is interrupted when the end of the message or other subject matter appearing on the sheet 446 is reached. This is accomplished by the stylus 498 contacting the metallic surface of the grounded drum 28 through the hole 540 punched in the sheet 446 at an appropriate place. This causes the operating coil 541 of the control relay 542 to be energized from the current source 543 provided that the arm of the switch 544 is on its contact marked "Send." The relay 542 is locked up over a circuit which includes the source 546, the relay armature 548 and the locking coil 547. The solenoids 508 and 489 are energized at this time, the former permitting the carriage 496 to return to its starting point and the latter causing the spindle 482 to move to the left. As the spindle moves to the left, it closes the contacts of the switch 487 which energizes solenoids 471 and 478 from the source 550. The arms of the switch 487 are sufficiently flexible to permit necessary movement of the spindle 482. Relay 551 which is energized at this time does not open the circuits supplying energy to the coils 471 and 478 since this relay is of the kind which is slow to respond and may be of any suitable type employing a dashpot or a thermal current arrangement to secure the desired delay. When the magnet 478 is energized, it immediately draws the members 457 downwardly so that the copyholder 28 which is being scanned does not come in contact with the conducting arms 553 which are carried upon but insulated from the parts 457. Energization of the solenoid 471 permits the next copyholder to drop, whereupon it is caught by the teeth 469 and when the circuit feeding the solenoid 471 is broken at the relay 551, the copyholder caught by the teeth 469 drops and rolls into the notches provided by the shoulders 474, the members 459 having returned to the position illustrated by full lines in Fig. 11 of the drawings.

When the fresh copyholder which is to be scanned comes in contact with the insulated part 553, it completes a circuit from ground by way of a conductor 556 which short circuits the locking coil 547 of the relay 542, allowing its armature 548 to be released. Spindle 482 moves to the left bringing the copyholder into operative scanning position and the solenoid 508 is deenergized engaging the half-nut with the carriage driving screw.

The apparatus of Figs. 9, 10 and 11 may be operated as a receiver by placing the switch 529 at its left hand position which applies signals from the line L to the primary 557 of the receiving transformer 558. One of the secondaries 559 of this transformer is connected by way of a conductor 560 to the receiving stylus 479.

A vacuum tube detector 561 has its cathode and control grid connected to a secondary 562 of the receiving transformer so that it will rectify incoming signals and apply them to a resonant relay 564. The relay 564 is of a type which responds to a given frequency which in this instance is the frequency which is applied at the transmitter by the transformer 532. Therefore, when carrier current is received modulated by the selected end of message signalling frequency, the relay 564 operates to apply current to the operating coil 541 of the relay 542 provided the switch 544 is in its position marked "R."

The operation of the mechanical parts in changing copyholders is precisely the same as described in connection with the device operating as a transmitter.

With the apparatus of Figs. 9, 10 and 11 operating as a transmitter, constant length subject matter may be repeatedly transmitted by setting the switch 566 so that it will be closed by the lug 567 on the carriage 496. Closing of the switch 566 will apply a current to energize the relay 542 with the switch 544 in its middle position.

It will be understood that the principle embodied in the control arrangement disclosed by Fig. 11 of the drawings may be used for controlling the apparatus of Figs. 1, 2, 6 and 7 as well as the apparatus of Figs. 9 and 10. The method of obtaining the modulated control signal by means of direct current saturation of a transformer used for picture transmission is believed to be entirely novel and is an important feature of the present invention.

Figure 12:
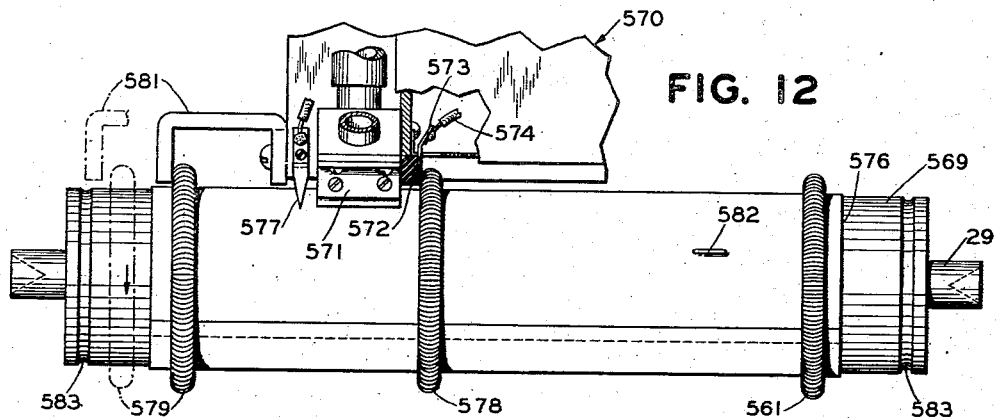
Fig. 12 is a fragmentary view showing a sheet holding device provided with an end of message indicator or control in accordance with the invention.

Referring now to Fig. 12 which discloses in detail the use of elastic toroidal members for retaining copy on a platen copyholder which is circular in cross section, reference character 569 designates the copyholder which in the specific example chosen for illustration is similar to copyholders 28 previously discussed except that for purposes of illustrating special advantages of this phase of the invention, the copyholder 569 is shown as being of considerable length. Reference character 570 designates any scanning device and relative movement between the scanning device 570 and the copyholder 569 may be obtained by moving either. The operating head 571 of the optical pickup is provided with an insulating block 572 which supports a conductor member 573. The latter is connected by the conductor 574 to any control system which is to be operated at a predetermined time during scanning of the message or picture on the blank 576. The independent stylus 577 furnishes an alternative means for sending or receiving.

The sheet 576 is retained on the copyholder 569 by the elastic spring member 578. It has been found in practice that one spring member only will serve to retain a sheet of considerable length in position upon a copyholder. However, to insure that the sheet will remain firmly in place, it is desirable to use additional spring members which are designated 579 and 561. The initial position of the member 579 is illustrated in dot-dash lines adjacent the left hand end of the copyholder and as scanning proceeds, this garter spring is carried along by a member 581 which is secured at a convenient point on the scanning device 570. As illustrated in Fig. 12, scanning has advanced so that the garter 579 embraces the sheet 576 to assist the remaining garters in their function.

Assuming that substantially the entire surface of the sheet 576 is to be scanned, garters 578 and 561 will move completely off the sheet which will be retained solely by the band 579.

Where the conducting member 573 which serves as a pusher for the garter 578 is to be used for control purposes, a conducting member such as a staple 582 may be secured in the sheet 576 at any predetermined point and as the garter 578 is advanced by the scanning device 570, contact will be established from the metallic surface of the copyholder 569 through the staple 582, the garter spring 578 to the conducting member 573. The staple 582 is preferably of the kind which is employed for fastening stationery. Grooves 583 may be provided to retain a toroidal member in readiness for slipping over a sheet 576.

Several important advantages of the toroidal spring members have been pointed out in connection with the description of Fig. 3 of the drawings and in addition it may be stated that the edges of the sheet 576 whether or not they overlap as shown, may be positioned anywhere around the circumference of the cylinder 579 inasmuch as no part of the sheet securing means is fixed to the cylinder 569.

Figure 15:
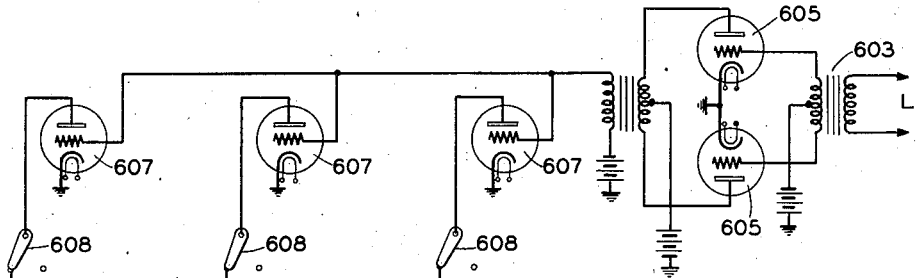
Fig. 15 is a schematic diagram of the electrical circuits of the receiver of Figs. 13 and 14.
Figure 14:
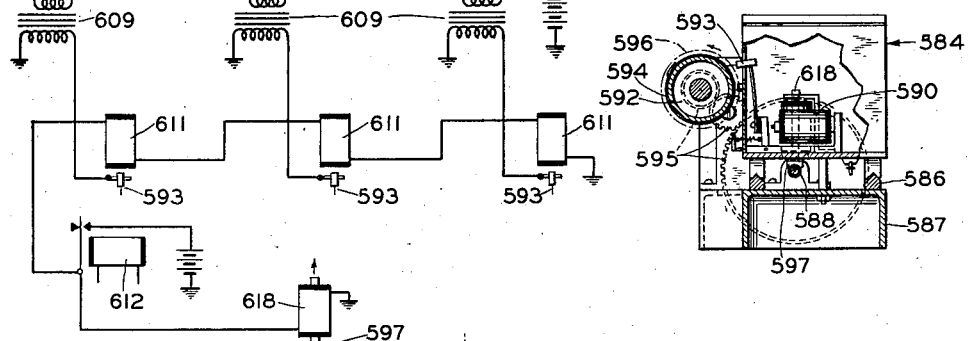
Figs. 13 and 14 are a top plan and a sectional elevation, respectively, of a modified receiver embodying the invention.
Figure 13:
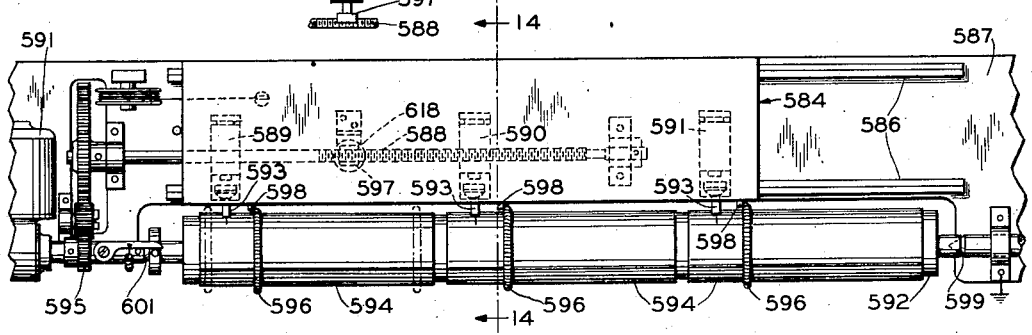

Figs. 13, 14 and 15 of the drawings illustrate a modification in which several copies of the received message or picture are obtained. Referring to Figs. 13 and 14, a carriage 584 of any suitable kind slides transversely on the rails 586 provided on the base 587, and is propelled by a screw 588 driven from the motor 591 by gearing 595 as shown and half-nut 597. The carriage 584 which is shown conventionally is sufficiently long to accommodate a plurality, in the present instance three, recording devices designated 589 to 591. The elongated copyholding cylinder 592 is rotatably carried by any suitable means so that the recording styli 593 may traverse the surfaces of one long sheet or a plurality of recording sheets 594, secured thereon. These sheets, three in number, are preferably secured to the cylinder by means of garters 596 which are moved longitudinally of the sheets by lugs 598. As shown on Fig. 13, the cylinder 592 is supported on centers 599 and 601 similar to those illustrated in the preceding modifications. However, it will be understood that the cylinder as stated may be supported and driven in any suitable way.

In Fig. 15, which illustrates the electrical circuits supplying received signals to the plurality of styli 593, 603 designates the receiving transformer, the primary of which is in communication with transmission channel L. The secondary thereof supplies a push-pull vacuum tube amplifier 605 which has its output connected in parallel to three amplifying devices 607. The anodes of the amplifying devices 607 are connected by means of switches 608, one for each amplifier, to their transformers 609. The secondaries of these transformers are connected to their respective styli 593 so that the incoming signals of the communication channel L may be impressed simultaneously upon all three of the styli whereby three copies of the incoming picture or message may be recorded simultaneously. If desired, the switches 608 may be used to cut out one or more of the styli.

The styli may be lifted simultaneously from contact with the surface of the cylinder 592 by means of solenoids 611 under control of a relay 612 which is identical in function with the relay 196 disclosed in Fig. 3 of the drawings. Likewise, where the carriage 584 is propelled by the half-nut 597 and the lead screw 588, the half-nut may be disengaged from the lead screw by a solenoid 618 energized simultaneously with the magnets 611 under control of the relay 612.

From the foregoing complete description of the several illustrative embodiments and their operation, it will be seen that an entirely automatic facsimile telegraph system is provided by the present invention.

While the invention has been explained and described in detail in connection with a number of illustrative embodiments thereof, it is to be understood that the invention may be embodied in other forms and, therefore, the invention is not limited except as indicated by the terms and scope of the appended claims.

What is claimed is:

1. Apparatus for facsimile telegraphy comprising a scanning device, means to support a copyholder in operative relationship with said scanning device during a scanning operation, and automatic means for successively supplying copyholders to said first named means whereby successive subjects may be transmitted continually and automatically.

2. In apparatus for facsimile telegraphy, the combination of a copyholder, stationary supporting means for said copyholder, driving means adapted for engagement with said holder when said holder is operatively removed from said supporting means, and automatic means to remove said copyholder from said supporting means and place it in engagement with said driving means.

3. In apparatus for facsimile telegraphy, the combination of a copyholder, stationary supporting means to receive said holder before and after a scanning operation, driving means for driving said holder during a scanning operation, bearing means for rotatably supporting said copyholder during a scanning operation, and means for causing automatic operation of said bearing means, said driving means being designed to engage and drive said holder when said holder is operatively received by said bearing means in preparation for a scanning operation.

4. In apparatus for facsimile telegraphy comprising a scanning device, the combination of a driving member, a support for a copyholder to hold the same before and after a scanning operation, driving means associated with said member and adapted to engage a copyholder during a scanning operation, automatic means for supplying copyholders in succession to said support, and means to discharge a copyholder from said support upon completion of a scanning operation.

5. In apparatus for facsimile telegraphy comprising a scanning device, the combination of a copyholder, a driving member, a movable support for said copyholder to hold the same before and after a scanning operation, driving means associated with said driving member and adapted to engage said copyholder during a scanning operation, and automatic means for imparting movement to said support whereby to cause the copyholder to be received on said support in preparation for a scanning operation, said automatic means serving also to impart movement to said support following a scanning operation for removing the copyholder from said support.

6. In apparatus for facsimile telegraphy, the combination of a copyholder, driving means for said copyholder including a clutch member, bearing means adapted to support said copyholder in cooperation with said driving means, and transmitted subject matter controlled means operable to cause said driving means and said bearing member to release said copyholder.

7. In apparatus for facsimile telegraphy, the combination of a copyholder, driving means for said copyholder in operative engagement therewith, and transmitted subject matter controlled means to cause said driving means to release said copyholder from operative engagement.

8. In apparatus for facsimile telegraphy, the combination of a copyholder, a clutch and a member operating at a desired scanning speed and driven from said clutch, releasable means to prevent rotation of said member, copyholder supporting means and driving means associated with said member, said driving means being adapted to couple said copyholder to said member when said copyholder is operatively received by said supporting means.

9. The combination set forth in claim 8 including automatic means to move said copyholder into engagement with said supporting means, and means governed by length of the transmitted subject matter operative to effect control of said automatic means.

10. In apparatus for facsimile telegraphy, the combination of a copyholder, a clutch and a copyholder supporting and driving member operating at a desired scanning speed and driven from said clutch, a supporting bearing to cooperate with said member to support said copyholder in scanning position, means to provide relative movement between said member and said bearing, said driving member being adapted to drive said copyholder when said copyholder is operatively received by said supporting bearing upon occurrence of relative movement between said member and said bearing.

11. In facsimile telegraph apparatus for automatically transmitting or receiving subject matter in the form of messages or pictures, the combination of a copyholder, means to support said copyholder prior to a scanning operation, said holder being provided with support engaging means, subject matter controlled supporting and driving means adapted to cooperate with said support engaging means to thereby remove said copyholder from said first named supporting means and to impart driving movement thereto.

12. An automatic facsimile telegraph transmitter-receiver comprising copyholder supporting and driving means designed to receive interchangeable copyholders, a scanning device and guide means to slidably support said device for movement in a direction longitudinally of a copyholder positioned by said first named means, means to propel said scanning device, and subject matter controlled means for controlling operation of said copyholder supporting and driving means and movements of said scanning device.

13. In mechanism for placing separate and unconnected pieces of subject matter in and removing the same from scanning relationship with the scanning device of a facsimile telegraph machine, means to store one or more of said pieces of subject matter in readiness to be scanned, means to remove said pieces one at a time in succession from said storing means, means to place a piece of subject matter removed from said storing means in scanning position adjacent said scanning device, and means to remove a scanned piece from scanning position following a scanning operation.

14. In a facsimile telegraph machine, a copyholder changing mechanism comprising storage means for copyholders, a latch to retain said copyholders in said storage means, a tiltable copyholder receiving cradle, cradle tilting means, and means on said cradle to operate said latch when said cradle is tilted thereby to place a copyholder in said cradle in preparation for a scanning operation, said cradle being formed to discharge a copyholder therefrom following a scanning operation when said tilting means operates.

15. In a facsimile telegraph machine, copyholder changing mechanism comprising storage means for copyholders, a rotatable feed device for copyholders comprising axially spaced discs having a plurality of axially aligned peripheral notches, stepping means to rotate said feed device through an angle equal to the angular distance between the notches on one of said discs whereby a copyholder is received from said storage means in a set of aligned notches for each movement of said discs, and means to retain a copyholder received in a set of notches following one stepping movement of said discs in preparation for a scanning operation, said last named means being formed to permit release of said retained copyholder from said device at the next stepping movement thereof following a scanning operation.

16. In a facsimile telegraph machine, a copyholder changing mechanism comprising storage means for copyholders, an escapement device to retain copyholders in said storage means, an electromagnet for operating said escapement device, a movable cradle to receive a copyholder released by said escapement device in preparation for a scanning operation, an electromagnet for operating said cradle, said cradle being formed to release a copyholder upon movement thereof, control means to energize said electromagnets simultaneously following a scanning operation whereby a copyholder previously released from said rack is discharged from said cradle and a fresh copyholder is placed on said cradle.

17. In a system for facsimile transmission and reception, a transmitter and a receiver adapted for interconnection by a communication circuit, a source of subject matter modulated carrier current at said transmitter, a recording device at said receiver operable to record in response to said modulated carrier, an additional source of carrier current at said transmitter, means controlled in accordance with a characteristic of the subject matter being transmitted to interrupt said subject matter modulated carrier current supplied to said communication circuit and to connect said additional source to said communication circuit.

18. In a system for facsimile transmission and reception, a message circuit, terminal apparatus utilizing said circuit comprising at each terminal station a pickup device and a recording device, means common to both said devices for producing scanning movement with respect to a copyholder associated with said devices, an independent source of alternating current, switching means adapted to connect said message circuit to said pickup device for transmission over said message circuit and to connect said message circuit to said recording device for reception, and automatic means controlled by the position of said first named means with respect to said copyholder for supplying alternating current from said alternating current source to said message circuit.

19. In a facsimile telegraph system, a communication channel, transmitting apparatus comprising a scanning device in communication with said channel, a copyholder, and means to secure relative movement between said device and said copyholder, said scanning device in operation producing a modulated carrier current, a source of unmodulated carrier current having a frequency lying within the frequency band occupied by said modulated carrier, means controlled by the position of said scanning device with respect to said copyholder to disconnect said device from said channel and to place said source of carrier in communication with said channel.

20. In a facsimile telegraph system, a transmitter and a receiver interconnected by a communication channel, said transmitter comprising a scanning device, a copyholder, and means to secure relative movement between said device and said copyholder, said scanning device in operation producing a modulated carrier current, a source of unmodulated carrier current at said transmitter, means controlled by the position of said scanning device with respect to said copyholder to disconnect said scanning device from said channel and to place said source of carrier in communication with said channel, a movable member at said receiver, and means at said receiver to control movement of said member in response to carrier current received from said unmodulated source.

21. In a system for producing images of a picture or other object electrically, two sources of carrier waves, means to modify the carrier waves from one of said sources in accordance with the tone values of elemental areas of said picture or object, means including a movable element for reproducing said images, and means controlled by application thereto for an appreciable time of unmodified carrier waves from one of said sources to control the movement of said movable element.

22. In a system for producing images of a picture or other object electrically, two sources of carrier waves, means to modify the carrier waves from one of said sources in accordance with the tone values of elemental areas of said picture or object, means including a movable element for reproducing said images, means controlled by application thereto for an appreciable time of unmodified carrier waves from one of said sources to stop movement of said movable element, and means operable on interruption of said unmodified carrier waves to start movement of said movable element.

23. In a facsimile receiver, a copyholder changing mechanism, a motor for driving said mechanism, switching means for starting said motor having a delayed response characteristic, signal responsive means to initiate operation of said switching means from a remote transmitter, and means controlled by said copyholder changing mechanism for stopping said motor upon completion of a copyholder changing cycle of said mechanism.

24. In a facsimile receiver, a copyholder changing mechanism, a motor for driving said mechanism, a relay for controlling the operating circuit of said motor, an operating winding on said relay, means in circuit with said operating winding to cause said winding to be effective for a brief period, a locking winding on said relay effective to retain said relay closed to cause continued operation of said motor, and means in circuit with said locking relay controlled by said copyholder changing mechanism to interrupt the circuit of said locking winding when said copyholder changing mechanism completes a copyholder changing cycle.

25. In a combined automatic facsimile transmitter-receiver, a scanning device, a copyholder changing mechanism and a motor for driving the same, control means operable on completion of a scanning operation by said scanning device for starting said motor, and means operable when said copyholder changing mechanism has completed a cycle for stopping said motor.

26. In a facsimile telegraph system, means including a scanning device cooperating with a copyholder for producing a current modulated in accordance with a picture or other representation, mechanism for discharging a copyholder from operative relationship with said scanning device and inserting another copyholder in operative relationship, and control means for said mechanism operable upon interruption of modulated current from said scanning device for causing said mechanism to operate.

27. In a facsimile telegraph system, means for producing a current modulated in accordance with a picture or other representation, means including a reproducing device cooperating with a copyholder for reproducing the picture or other representation in accordance with said modulated current, a line connecting said first and second named means, mechanism for discharging a copyholder from operative relationship with said reproducing device, and control means for said mechanism operable in response to a signal received over said line for causing said mechanism to operate.

28. In a facsimile telegraph system, means including a transmitting scanning device cooperating with a copyholder for producing a current modulated in accordance with a picture or other representation, mechanism for discharging a copyholder from operative relationship with said transmitting scanning device and inserting another copyholder in operative relationship, means including a current receiving reproducing device cooperating with a copyholder for reproducing the picture or other representation in accordance with said modulated current, mechanism for discharging a copyholder from operative relationship with said reproducing scanning device and inserting another copyholder in operative relationship therewith, control means individual to said transmitting and reproducing mechanisms operable upon interruption of modulated current from said scanning device for causing said mechanisms to operate.

29. In a facsimile telegraph system, means for producing a current modulated in accordance with a picture or other representation, means including a reproducing device cooperating with a copyholder for reproducing the picture or other representation in accordance with said modulated current, a line connecting said first and second named means, mechanism for discharging a copyholder from operative relationship with said reproducing device, and control means responsive to an absence of current in said line to cause operation of said mechanism.

30. In a system for producing images of a picture or other subject matter electrically, a source of carrier waves, means to modify carrier waves from said source in accordance with the tone values of elemental areas of a picture or other subject matter, means to modulate unmodified carrier waves from said source comprising a magnetic core transformer having a plurality of windings, a connection from said carrier source to one of said windings, a source of direct current and a source of alternating current modulating waves connected in series with another of said windings, a line and a connection from said line to a third winding on said transformer, said direct current source supplying current to saturate the core of said transformer whereby to cause modulation of the unmodified carrier waves by the alternating current waves.

31. In combination in a facsimile machine, a scanner, a copyholding member, said member being circular in cross section, and means comprising an elastic band for securing the copy to the outside thereof, said elastic band being of a character to roll freely along said member.

32. In combination in a facsimile machine, a scanner, a copyholding member, said member being circular in cross section, and means comprising an elastic toroidal member for securing the copy to the outside of said copyholding member.

33. In combination in a facsimile machine, a scanner, a copyholding member, said member being circular in cross section, and a helical spring in the form of an annulus for securing the copy to the outside of said copyholding member.

34. In combination in a facsimile machine, a copyholder member, said member being circular in cross section, a scanning device cooperating with said copyholder, means for producing relative movement of said copyholder with respect to said device in a direction axially of said copyholder and a plurality of toroidal members for securing the copy to the outside of said copyholding member spaced at intervals on said copyholder prior to relative movement thereof with respect to said device, said device moving said toroidal members progressively toward one end of said copyholder.

35. In a telegraph system, a copyholder and a scanning device cooperating with a sheet on said copyholder, an elastic band of conducting material for securing said sheet on the outside of said copyholder, means for producing relative movement between said copyholder and said device in a direction axially of said copyholder, means associated with said device for causing said elastic band to traverse said copyholder with said device, signalling means including an electric circuit, said band serving to change current conditions in said circuit at a predetermined point in its travel along said copyholder.

36. In a telegraph system, a copyholder and a scanning device cooperating with a sheet on said copyholder, an elastic toroidal member capable of rolling freely for securing said sheet on the outside of said copyholder, a second toroidal member being resistant to rolling placed at a predetermined point on said copyholder, means for producing relative movement between said copyholder and said device in a direction axially of said copyholder, signalling means including an electric circuit, a switch associated with said scanning device for controlling said circuit, said switch having an operating member in contact with said first named toroidal member causing the same to traverse said copyholder with said scanning device, said switch being operated by the increase of force on said operating member when said first named toroidal member bears against said second named toroidal member.

37. In a telegraph system, a copyholder and a scanning device cooperating with a sheet on said copyholder, a toroidal member for securing said sheet on the outside of said copyholder, means for producing relative movement between said copyholder and said device in a direction axially of said copyholder, means associated with said scanning device for causing said elastic band to traverse said copyholder with said device signalling means including an electric circuit, one terminal of said circuit being connected to said copyholder and another terminal to said means associated with said scanning device, a conducting member secured to said sheet at a predetermined point and in contact with the underlying surface of said copyholder whereby said toroidal member completes said circuit upon contacting said conducting member secured to said sheet.

38. In a facsimile telegraph system, a receiver comprising a copyholder, a plurality of scanning devices, means to supply said scanning devices with picture modulated current from a common source, recording means on said copyholder, and means to produce relative movement between said scanning devices and said copyholder whereby a plurality of identical copies of a picture or other representation are produced on said recording means.

39. In a telegraph system, a copyholder and a scanning device cooperating with a sheet on said copyholder, a toroidal member for securing said sheet on the outside of said copyholder, means for producing relative movement between said copyholder and said device in a direction axially of said copyholder, means associated with said scanning device for causing said elastic band to traverse said copyholder with said device, signalling means including an electric circuit, one terminal of said circuit being connected to said copyholder and another terminal to said means associated with said scanning device, a paper fastening staple secured to said sheet at a predetermined point whereby said toroidal member completes said circuit upon contacting said conducting member secured to said sheet.

40. In a facsimile telegraph system, a receiver comprising a copyholder, a plurality of scanning devices, means to supply said scanning devices with picture modulated current from a common source, a plurality of record sheets on said copyholder each sheet being associated with one of said scanning devices, and means to produce relative movement between said scanning devices and said copyholder whereby a plurality of identical copies of a picture or other representation are produced.

41. A facsimile machine adapted for use with a plurality of copyholders comprising means to accept, scan and eject the said copyholders from said machine.

42. The invention as defined in claim 41 wherein means operated in accordance with the length of subject matter controls said first named means.

43. In apparatus for facsimile telegraphy, the combination of a copy-holder, stationary supporting means for said copy-holder, driving means adapted for engagement with said holder when said holder is operatively removed from said supporting means, a reciprocating member opposite and in axial alignment with said driving means, and mechanism operatively connected to said reciprocating member to move the same toward said driving means to lift the copyholder from said supporting means.

44. In a facsimile receiver, a copy-holder changing mechanism, a motor for driving said mechanism, said copy-holder changing mechanism comprising a shaft driven from said motor and a cam on said shaft, a relay for controlling the operating circuit of said motor, an operating winding of said relay, means in circuit with said operating winding to cause the same to be effective for a brief period comprising a condenser and a resistor connected in shunt therewith, a locking winding on said relay effective to retain said relay closed to cause continued operation of said motor, and means, including a switch adapted to be operated by said cam as said copy-holder mechanism completes a copy-holder changing cycle, in circuit with said locking relay controlled by said copy-holder changing mechanism to interrupt the circuit of said locking winding when said copy-holder changing mechanism completes a copy-holder changing cycle.

45. A facsimile machine comprising a scanner, said machine being adapted for use with a plurality of copyholders and comprising means to accept said copyholders for a scanning operation on each in turn, and means operating in accordance with the length of the subject matter to be scanned on each copyholder to eject the said copyholders from the machine.

46. An automatic telegraph system comprising transmitting apparatus for transmitting signals representative of a message appearing on a message bearing sheet, receiving apparatus responsive to said signals for receiving said message, means for operatively associating said message bearing sheet with said transmitting apparatus for automatic transmission of the message and means controlled by the message bearing sheet for coordinating the operation of said transmitting and receiving apparatus.

47. In combination, telegraph apparatus for scanning a message appearing on a message bearing sheet and automatically transmitting signals representative of said message, receiving apparatus responsive to said signals for receiving said message, means for operatively associating said message bearing sheet with said scanning apparatus for automatic transmission of the message, said message bearing sheet having a portion thereof which, when scanned by the transmitting apparatus, causes a synchronizing signal to be transmitted to the receiving apparatus, and means responsive to said latter signal for synchronizing the transmitting and receiving apparatus.

48. In a system for facsimile transmission and reception, a transmitter and a receiver adapted for interconnection by a communication circuit, a source of subject matter modulated carrier current at said transmitter, a recording device at said receiver operable to record in response to said modulated carrier current, means to stop said transmitter after transmission of a piece of subject matter, and means controlled in accordance with the operation of said last means automatically to interrupt the operation of said receiver.

49. In a facsimile telegraph system, a facsimile transmitter-receiver comprising a copy holder and a scanning device, means to provide relative scanning movement between said copy holder and said scanning device, a phasing device driven in synchronism with said means, a second facsimile transmitter-receiver, a transmission channel interconnecting said transmitter-receivers, said last named transmitter-receiver comprising a copy holder and a scanning device, means to provide relative scanning movement between said copy holder and said scanning device, means to prevent relative scanning movement prior to a desired scanning operation, and means responsive to said phasing device to release said scanning movement preventing means whereby the copy holders of both said facsimile transmitter-receivers will be in the desired phase position relative to their respective scanning devices.

50. In a facsimile telegraph system, a facsimile transmitter-receiver comprising a copy holding cylinder and a scanning device, means to provide relative scanning movement between said cylinder and said scanning device, a phasing commutator driven in synchronism with said cylinder by said means, a second facsimile transmitter-receiver, a transmission channel interconnecting said transmitter-receivers, said last named transmitter-receiver comprising a copy holding cylinder and a scanning device, means to provide relative scanning movement between said cylinder and said scanning device, a detent to prevent rotation of said last named cylinder prior to a desired scanning operation, and a magnet responsive to a pulse derived from said phasing commutator to release said detent whereby the cylinders of both said facsimile transmitter-receivers will be in the desired phase position relative to their respective scanning devices.

51. In a facsimile telegraph system, a transmitter, a receiver, a communication channel interconnecting said transmitter and receiver, means at said transmitter for generating alternating current signals modulated to represent a message or picture, means for modulating alternating current signals generated at said transmitter by a predetermined frequency substantially at the time of completion of a scanning operation, control means at said receiver responsive to said predetermined modulating frequency to control the operation of said receiver.

52. In a facsimile telegraph machine, a copy holder and a scanning device, means to provide relative scanning movement between said copy holder and said scanning device, means to produce a signal upon completion of a scanning operation and means operable upon continued relative movement between said copy holder and said device to operate said signaling means, the point of operation of said last named means being selectively adjustable in accordance with the length of subject matter to be transmitted.

53. An automatic telegraph system comprising transmitting apparatus for transmitting groups of signals, each group being representative of one of a plurality of messages appearing respectively on a plurality of message bearing sheets, receiving apparatus responsive to said signals for receiving said messages, means for operatively associating successively said message bearing sheets with said transmitting apparatus for automatic transmission of the messages, and means controlled by each message bearing sheet for coordinating the operation of said transmitting and receiving apparatus.

54. In combination, telegraph apparatus for scanning in succession a plurality of messages appearing respectively on a plurality of message bearing sheets and automatically transmitting a group of signals representative of each message, receiving apparatus responsive to said signals for receiving in succession said plurality of messages, means for operatively associating each message bearing sheet with said scanning apparatus for automatic transmission of the message, means controlled by the length of each message for interrupting the operation of said transmitting apparatus and transmitting a coordinating signal, and means responsive to said coordinating signal for interrupting the operation of said receiving apparatus substantially simultaneously with the interruption of said transmitting apparatus.

55. In a system for facsimile transmission and reception, a transmitter and a receiver adapted for interconnection by a communication circuit, a source of carrier current at said transmitter modulated in accordance with a plurality of pieces of subject matter, a recording device at said receiver operable to record successively said pieces of subject matter in response to said modulated current, means to stop said transmitter after the transmission of each piece of subject matter, and means controlled in accordance with each operation of said stopping means automatically to interrupt the operation of said receiver after the recording of each piece of subject matter.

56. A facsimile machine adapted for use with a plurality of copyholders, each including means for supporting a message sheet, comprising means operable automatically to accept, scan and eject successively in predetermined order the said copyholders from said machine.

57. In a facsimile machine, a plurality of copyholders for use with said machine, said copyholders each having means for supporting a message sheet, means to accept, scan and eject successively in predetermined order the said copyholders from said machine, and means responsive to the length of each message for automatically controlling said last-named means.

RALEIGH J. WISE.
GARVICE H. RIDINGS.
FREDERIC L. O'BRIEN.
FERNAND E. D'HUMY.